US011671880B2

(12) United States Patent
Wei et al.

(10) Patent No.: US 11,671,880 B2
(45) Date of Patent: *Jun. 6, 2023

(54) WIRELESS TELECOMMUNICATIONS SYSTEM, TERMINAL DEVICE, INFRASTRUCTURE EQUIPMENT, INTEGRATED CIRCUITRY AND METHODS

(71) Applicant: Sony Group Corporation, Tokyo (JP)

(72) Inventors: Yuxin Wei, Basingstoke (GB); Hideji Wakabayashi, Basingstoke (GB); Shinichiro Tsuda, Basingstoke (GB); Brian Alexander Martin, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 17/372,531

(22) Filed: Jul. 12, 2021

(65) Prior Publication Data
US 2021/0345190 A1 Nov. 4, 2021

Related U.S. Application Data

(63) Continuation of application No. 16/820,719, filed on Mar. 17, 2020, now Pat. No. 11,064,400, which is a
(Continued)

(30) Foreign Application Priority Data

Mar. 16, 2016 (EP) ..................................... 16160759

(51) Int. Cl.
*H04W 36/00* (2009.01)
*H04W 72/20* (2023.01)
(Continued)

(52) U.S. Cl.
CPC ... *H04W 36/0055* (2013.01); *H04W 36/0009* (2018.08); *H04W 36/0058* (2018.08);
(Continued)

(58) Field of Classification Search
CPC ............. H04W 36/00; H04W 36/0009; H04W 36/0055; H04W 36/0058; H04W 36/0061;
(Continued)

(56) References Cited

U.S. PATENT DOCUMENTS 8,886,113 B2 11/2014 Palanki et al.
9,007,979 B2 4/2015 Lee et al.
(Continued)

FOREIGN PATENT DOCUMENTS

CN 103069869 A * 4/2013 ............ H04W 28/12
CN 103069869 A 4/2013
(Continued)

OTHER PUBLICATIONS

Holma, H. and Toskala, A., "LTE for UMTS: OFDMA and SC-FDMA Based Radio Access," First published: Mar. 31, 2009, Copyright © 2009 John Wiley & Sons, Ltd,Print ISBN:9780470994016, pp. 1-8.
(Continued)

*Primary Examiner* — Charles T Shedrick
(74) *Attorney, Agent, or Firm* — Xsensus LLP

(57) ABSTRACT

The present technique provides a first terminal device for exchanging signals with a wireless telecommunications network and a plurality of second terminal devices, the first terminal device configured to exchange signals with each of the plurality of second terminal devices, when the first terminal device provides a local cell for providing wireless connectivity for the plurality of second terminal devices, and to exchange signals with one or more infrastructure equipment of the wireless telecommunications network, and
(Continued)

receive, from each of the plurality of second terminal devices served by the first terminal device when providing the local cell, suitability information indicative of the suitability of each of one or more other terminal devices or infrastructure equipment of the wireless telecommunications network to exchange signals with that second terminal device to provide for that second terminal devices another local cell.

17 Claims, 12 Drawing Sheets

Related U.S. Application Data continuation of application No. 16/082,286, filed as application No. PCT/EP2017/054915 on Mar. 2, 2017, now Pat. No. 10,609,601.

(51) Int. Cl.
  *H04W 72/52* (2023.01)
  *H04W 36/32* (2009.01)
(52) U.S. Cl.
  CPC ... *H04W 36/0061* (2013.01); *H04W 36/0072* (2013.01); *H04W 36/32* (2013.01); *H04W 72/20* (2023.01); *H04W 72/52* (2023.01)
(58) Field of Classification Search
  CPC ............ H04W 36/0072; H04W 36/32; H04W 72/0406; H04W 72/0486
  See application file for complete search history.

(56) References Cited

U.S. PATENT DOCUMENTS

| | | |
|---|---|---|
| 9,066,242 B2 | 6/2015 | Kazmi |
| 2008/0056199 A1 | 3/2008 | Park et al. |
| 2010/0296432 A1 | 11/2010 | Mehta et al. |
| 2011/0122805 A1 | 5/2011 | Abraham et al. |
| 2012/0002643 A1 | 1/2012 | Chung et al. |
| 2013/0034050 A1 | 2/2013 | Ros et al. |
| 2013/0059590 A1 | 3/2013 | Teyeb et al. |
| 2013/0194948 A1 | 8/2013 | Mallik et al. |
| 2013/0203416 A1 | 8/2013 | Raaf et al. |
| 2013/0322325 A1 | 12/2013 | Hahn et al. |
| 2014/0023045 A1 | 1/2014 | Li et al. |
| 2014/0226570 A1 | 8/2014 | Comeau et al. |
| 2014/0289581 A1 | 9/2014 | Maret et al. |
| 2015/0133131 A1 | 5/2015 | Van Phan et al. |
| 2015/0304913 A1 | 10/2015 | Uusitalo |
| 2015/0312788 A1 | 10/2015 | Delsol et al. |
| 2015/0312811 A1 | 10/2015 | Lei |
| 2016/0174194 A1 | 6/2016 | Suzuki et al. |
| 2016/0192254 A1 | 6/2016 | Hooli et al. |
| 2018/0069618 A1 | 3/2018 | Loehr et al. |
| 2018/0084442 A1 | 3/2018 | Lee et al. |
| 2018/0092022 A1* | 3/2018 | Huang ............ H04W 36/0077 |
| 2018/0109985 A1 | 4/2018 | Huang et al. |
| 2019/0215733 A1 | 7/2019 | Wang et al. |

FOREIGN PATENT DOCUMENTS

| | | | |
|---|---|---|---|
| CN | 103702421 A | 4/2014 | |
| CN | 103874046 A | 6/2014 | |
| CN | 107306452 A | * 10/2017 | ............ H04W 72/04 |
| CN | 107306452 A | 10/2017 | |
| CN | 107734649 A | * 2/2018 | ............. H04W 8/00 |
| CN | 107734649 A | 2/2018 | |
| WO | WO-2015065257 A1 | 5/2015 | |
| WO | 2016/161745 A1 | 10/2016 | |
| WO | WO-2016161745 A1 | * 10/2016 | ............ H04W 76/30 |

OTHER PUBLICATIONS

Huawei, "Text Proposal capturing outcome of email discussion: [91bis#34][LTE/LATRED] CB-PUSCH," R2-156300, 3GPP TSG-RAN WG2 #92, Anaheim, USA, Nov. 16-20, 2015, pp. 1-9.
International Search Report and Written Opinion for International Application No. PCT/EP2017/054915 dated Jul. 26, 2017.

* cited by examiner

Background
Art

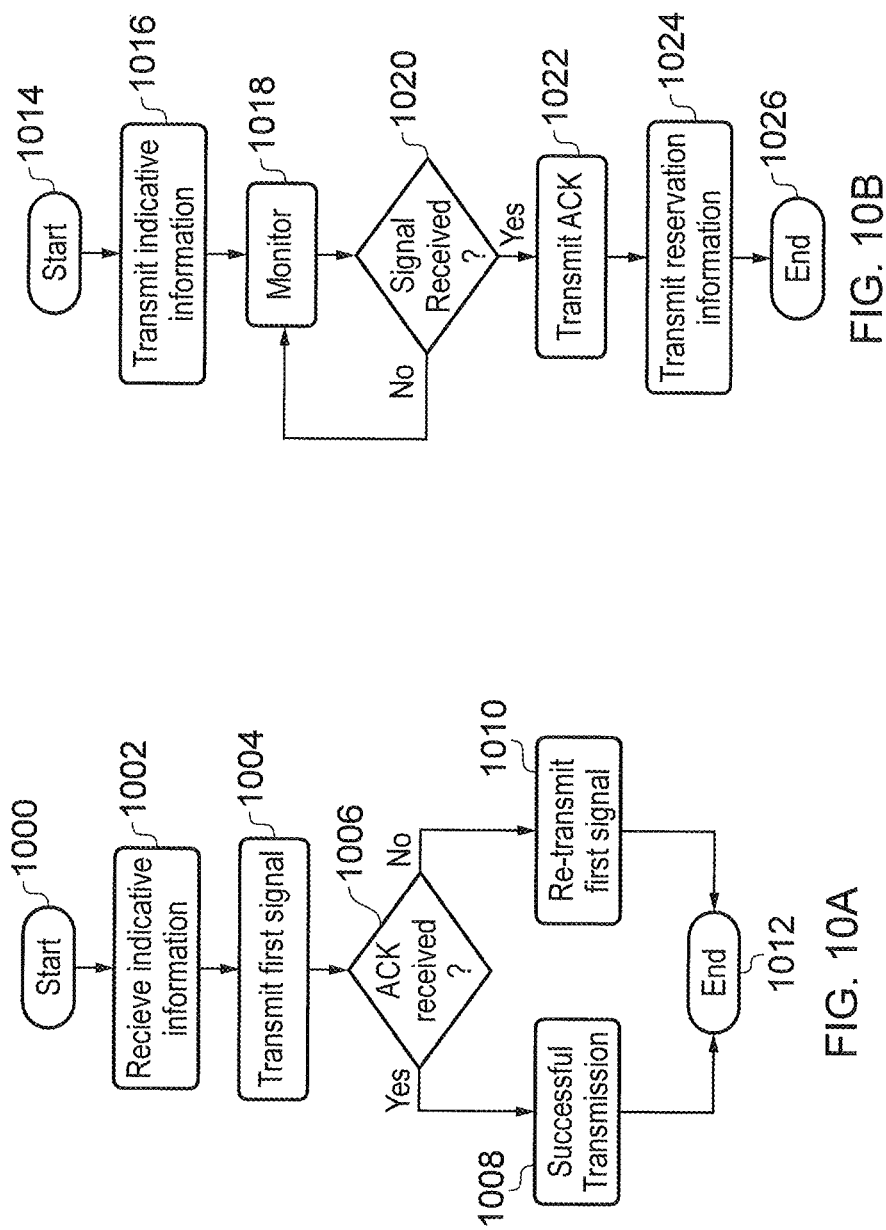

WIRELESS TELECOMMUNICATIONS SYSTEM, TERMINAL DEVICE, INFRASTRUCTURE EQUIPMENT, INTEGRATED CIRCUITRY AND METHODS

CROSS-REFERENCE TO RELATED APPLICATIONS

The present application is a continuation of U.S. application Ser. No. 16/820,719, filed Mar. 17, 2020, which is a continuation of U.S. application Ser. No. 16/082,286, filed Sep. 5, 2018 (now U.S. Pat. No. 10,609,601), which is based on PCT filing PCT/EP2017/054915, filed Mar. 2, 2017, which claims priority to EP 16160759.3, filed Mar. 16, 2016, the entire contents of each are incorporated herein by reference.

TECHNICAL FIELD OF THE DISCLOSURE

The present disclosure relates to a wireless telecommunications system, terminal device, infrastructure equipment, integrated circuitry and methods.

BACKGROUND OF THE DISCLOSURE

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly.

However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network.

In order to address these limitations, a terminal device (or user equipment, UE) may operate to provide a local cell, the local cell being a smaller cell at least a portion of which is provided within the larger cell of a base station. This UE works simultaneously as an intermediate node between other UEs in its vicinity and the network, as well as an intermediate node between other UEs. It communicates with its UEs in unlicensed, shared licensed or licensed bands, and backhauls to the network (using licensed bands, for example). The local cell is provided at least on a temporary basis by the terminal device.

It is noted that throughout this description, when it is said (for ease of explanation) that a local cell performs an action (such as transmitting, receiving or processing signals, for example), what is actually meant is that it is the UE providing that local cell which performs that action. It is also noted that a local cell may also be referred to as a virtual cell.

It is envisaged that local cells should take responsibilities like radio resource management, radio resource control (RRC) connection control, etc. instead of solely relying on an eNodeB or small cell of the network. Thus, the local cell will not only relay data, but will also help to organize the local network. The existence of such nodes in the network will help to, for example, offload the signaling overhead of the eNodeB (eNB), allocate radio resource efficiently, etc.

Various advantages of establishing an RRC connection between a local cell and UE are listed below.

(1) The RRC signaling overhead between the eNB and UE is reduced. In the conventional network architecture, the eNB should be responsible to maintain an RRC connection with every UE in coverage and the signaling overhead will be non-negligible in the dense UE scenario. One solution to reduce the signaling is to select some local cells located in coverage of the eNB. Each selected local cell will then manage the RRC connections with UEs within its range. With use of the local cell, the eNB will not need to maintain full RRC connections with UEs individually, but will instead only need to keep a partial RRC connection with the UEs.

(2) The use of centralized resource allocation within the local cell in order to improve spectrum efficiency and interference mitigation. Compared with single node centralized resource allocation at the eNB, the distributed resource allocation using local cells will have the merits of flexibility and robustness. Through coordination with local cells in the network, the eNB will have better control on the interference mitigation and resource management of the whole network, thus reducing inter-local cell interference. Furthermore, for each local cell, it is relatively easy to manage a smaller group of UEs, with a finer granularity in resources allocated to UEs within the range of the local cell so as to reduce the intra-local cell interference (with finer granularity, the number of resources which may be allocated is increased, and thus the probability of users sharing the same resources is decreased). Thus, each local cell takes responsibility for the resource allocation to each of its UEs. The RRC connection is then managed by the local cell to configure/re-configure the related physical control channels and data channels to receive the resource allocation grant and data, respectively, as well as other configurations to support the resource allocation (for example, buffer status report (BSR) timers, etc.).

(3) Mobility control is supported by the local cell in order to guarantee the service continuity. For an RRC_IDLE mode UE, if the UE establishes the RRC connection with the local cell, its position will be tracked by the local cell whether it is in the local cell RRC idle state (by paging to identify Tracking Area) or in the local cell RRC connected state. Through the local cell (together with the position of the local cell), the eNB could track the UE even when the UE is in RRC_IDLE mode. In addition, in order to keep the service continuity, it is important to support fall back to the network and/or handover to another local cell. The RRC connection of the UE with the local cell supports this requirement.

(4) Quality of Service (QoS) differentiation is supported. In future networks, it is important to support QoS differentiation among users as well as among services for each user. For a local cell, managing the resource allocations for different QoS classes is a way of improving the user perceived quality. The local cell should also be responsible for establishing/maintaining/releasing the corresponding radio bearers with the UEs in order to map the logical channel configuration with the services. The RRC connection between the local cell and UE supports the radio bearer establishment/maintenance/release.

(5) Measurement report sending is supported in order to improve spectrum efficiency and support service continuity. In order to support local resource allocation by the local cell, the local cell should know the link quality between the local cell and its scheduling UE. The UE needs to measure the channel quality with local cell and report this to the local cell in response to a trigger. The RRC connection between the local cell and UE should be established in order to configure the measurements and send back the measurement report to the local cell.

There are a number of problems with such use of local cells, however.

Firstly, it is noted that a local cell is usually triggered in hot spot area or in an on-demand manner. Both the local cell and UEs may move. For example, consider the following scenarios.

(1) Group split scenario. A local cell is triggered for a metro station in rush hour. Groups of people are walking towards the metro station while the other groups are leaving. For the groups moving towards the local cell, it's better to keep them served by the local cell. On the hand, for the leaving groups, it is better to fall back to the eNB or to handover to another local cell.

(2) Group merge scenario. A local cell V1 has been triggered for a metro station in rush hour. The UEs approaching V1 will connect locally with it. Another group of UEs is moving towards V1. A local cell V2 has been triggered to enhance inter-connectivity within the group. As the V2 group comes closer to the range of V1, it is better to merge the V1 and V2 groups.

(3) Group moving scenario. On the way home, colleagues in the same office building with a similar home destination may walk together to a metro station, take the same subway line, and walk back home in the same direction. A series of local cell may be triggered along the route and the group of people may handover from one local cell to another.

The commonalities of these groups are summarized as below.

(1) The group members are of geographical vicinity.

(2) The group members move towards approximately the same direction (3) The group members have low relative speed to each other.

There is a need to manage these groups of UEs. In particular, the groups need to be managed whilst taking into consideration the above-mentioned group characteristics. Furthermore, this should be achieved with reduced signaling overhead and improved handover efficiency. It is noted that, in particular, a management solution is sought for local cells which are deployed in a fixed way (that is, always there but with no or limited mobility with respect to UEs in its vicinity) and for UEs which have a fixed route or exhibit cluster behaviour. For example, for a local cell in a subway station (which may be, for example, a mobile phone of one or more of the platform staff), the surrounding UEs exhibit cluster behaviour as groups of people get on and off the subway, arrive at the subway station. Also, for a local cell in a moving vehicle (such as a train or bus), the surrounding UEs held by passengers in the vehicle have a fixed route.

There is also a need for a local cell to efficiently use the resources made available to it by the eNB for allocating to UEs connected to the local cell whilst, at the same time, ensuring low communication latency for those UEs. This applies particularly to uplink transmission from the UEs to the local cell.

SUMMARY OF THE DISCLOSURE

In a first aspect, the present technique provides a first terminal device for exchanging signals with a wireless telecommunications network and a plurality of second terminal devices, the first terminal device comprising: a transceiver configured to exchange signals with each of the plurality of second terminal devices, when the first terminal device provides a local cell for providing wireless connectivity for the plurality of second terminal devices, and to exchange signals with one or more infrastructure equipment of the wireless telecommunications network, and a controller configured to control the transceiver to receive, from each of the plurality of second terminal devices served by the first terminal device when providing the local cell, suitability information indicative of the suitability of each of one or more other terminal devices or infrastructure equipment of the wireless telecommunications network to exchange signals with that second terminal device to provide for that second terminal devices another local cell; and to control the transceiver to transmit a handover command to one or more of the plurality of second terminal devices, the handover command instructing the one or more second terminal devices to exchange signals with the wireless telecommunications network via an identified more suitable terminal device or infrastructure equipment for providing a local cell, if one of the one or more other terminal devices or infrastructure equipment of the wireless telecommunications network other than the first terminal device is identified as being more suitable for serving the one or more second terminal devices served by the first terminal device.

In a second aspect, the present technique provides infrastructure equipment for use with a wireless telecommunications network, the infrastructure equipment comprising: a transceiver configured to receive, from a first terminal device of the wireless telecommunications network, the first terminal device being configured to exchange signals with each of a plurality of second terminal devices of the wireless telecommunications network, when the first terminal device provides a local cell for providing wireless connectivity for the plurality of second terminal devices, and to exchange signals with the infrastructure equipment, suitability information indicative of the suitability of one or more other terminal devices or infrastructure equipment of the wireless telecommunications network to exchange signals with each of the plurality of second terminal devices to provide for that second terminal device another local cell; and a controller configured to determine, on the basis of the suitability information, whether one of the one or more other terminal devices or infrastructure equipment of the wireless telecommunications network is more suitable for serving one or more of the second terminal devices served by the first terminal device; in the case that one of the one or more other terminal devices or infrastructure equipment of the wireless telecommunications network is determined to be more suitable for serving one or more of the second terminal devices served by the first terminal device, control the transceiver to transmit information indicative of the identified one or more other terminal devices or infrastructure equipment to the first terminal device.

In a third aspect, the present technique provides a terminal device for use with a wireless telecommunications network as one of a group of terminal devices, the terminal device comprising: a transceiver configured to receive information indicative of a plurality of communication resources, each of the indicated plurality of communication resources being allocated for use by the terminal devices of the group in transmitting signals to the wireless telecommunications network on a contention basis; and a controller configured to control the transceiver to transmit a first signal to the wireless telecommunications network using a selected one of the allocated communication resources; to determine whether the transceiver has received an acknowledgement message from the wireless telecommunications network; if it is determined that the transceiver has received an acknowledgement message, determine that the first signal has been successfully received by the wireless telecommunications network; and if it is determined that the transceiver has not received an acknowledgement message, control the transceiver to re-transmit the first signal to the wireless telecommunications network, wherein the controller is configured in combination with the transceiver to perform a random selection operation by randomly selecting the one of the allocated communications resources for transmitting the first signal from the plurality of communication resources allocated to the group of terminal devices.

In a fourth aspect, the present technique provides a terminal device for use with a wireless telecommunications network, the terminal device comprising: a transceiver configured to transmit information indicative of a plurality of communication resources, each of the indicated plurality of communication resources being allocated for use by each of the terminal devices in a group of terminal devices in transmitting signals to the wireless telecommunications network via the terminal device on a contention basis, when the terminal device provides a local cell for providing wireless connectivity for the group of terminal devices; and a controller configured to: monitor the allocated communication resources for signals received at the transceiver from the terminal devices of the group, the monitoring comprising performing an operation with respect to each of the allocated communication resources to determine whether a signal has been received by the transceiver via that communication resource from a single identified one of the terminal devices of the group; and if it is determined that a signal has been received by the transceiver via one of the allocated communication resources from a single identified one of the terminal devices of the group, control the transceiver to transmit an acknowledgement message to the identified terminal device and transmit, to each of the terminal devices in the group, reservation information indicative of one or more of the allocated communication resources which are reserved for use by the identified terminal device.

In a fifth aspect, the present technique provides infrastructure equipment for use with a wireless telecommunications network, the infrastructure equipment comprising: a transceiver configured to transmit information indicative of a plurality of communication resources, each of the indicated plurality of communication resources being allocated for use by each of the terminal devices in a group of terminal devices in transmitting signals to the wireless telecommunications network via the infrastructure equipment on a contention basis; and a controller configured to: monitor the allocated communication resources for signals received at the transceiver from the terminal devices of the group, the monitoring comprising performing an operation with respect to each of the allocated communication resources to determine whether a signal has been received by the transceiver via that communication resource from a single identified one of the terminal devices of the group; and if it is determined that a signal has been received by the transceiver via one of the allocated communication resources from a single identified one of the terminal devices of the group, control the transceiver to transmit an acknowledgement message to the identified terminal device and transmit, to each of the terminal devices in the group, reservation information indicative of one or more of the allocated communication resources which are reserved for use by the identified terminal device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF DRAWINGS

Embodiments of the present disclosure will now be described by way of example only with reference to the accompanying drawings wherein like parts are provided with corresponding reference numerals and in which:

FIGS. 10A-B schematically show example processes as carried out according to a second embodiment of the present technique.

DESCRIPTION OF EXAMPLE EMBODIMENTS

Figure 1:
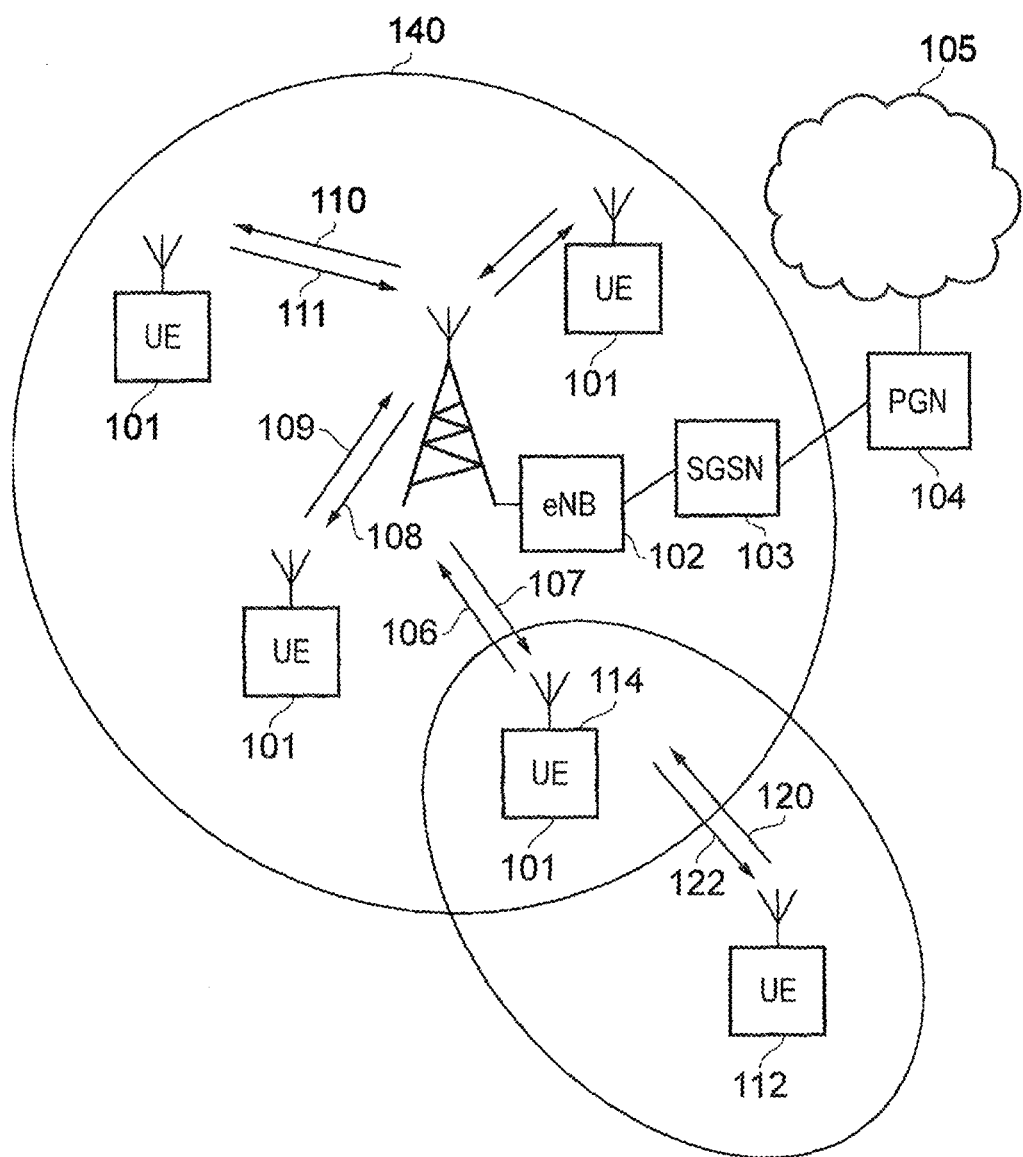
FIG. 1 provides a schematic diagram illustrating some basic functionality of a mobile telecommunications network/system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a conventional mobile telecommunications system 100, where the system includes mobile communications devices 101, infrastructure equipment 102, and a core network comprising a serving gateway node 103, a packet data gateway 104 which forms a gateway to an external network 105. The infrastructure equipment 102 may also be referred to as a base station, network element, enhanced Node B (eNodeB or eNB) or a coordinating entity for example, and provides a wireless access interface to the one or more communications devices within a coverage area or cell. The one or more mobile communications devices may communicate data via the transmission and reception of signals representing data using the wireless access interface. The infrastructure equipment 102 is communicatively linked via the serving gateway node 103 and the packet data gateway 104 to the external network 105, which may be connected to one or more other communications systems or networks which have a similar structure to that formed from communications devices 101 and infrastructure equipment 102. The core network may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 106 to 111, where arrows 106, 108 and 110 represent downlink communications from the network entity to the communications devices and arrows 107, 109 and 111 represent the uplink communications from the communications devices to the infrastructure equipment 102. The communications system 100 may operate in accordance with any known protocol, for instance in some examples the system 100 may operate in accordance with a 3GPP Long Term Evolution (LTE) standard where the infrastructure equipment 102 may be referred to as a base station or an enhanced Node B (eNodeB(eNB)).

Also shown in FIG. 1 is an example of a further communications device 112 which exchanges data with the eNB 102 via one of the UEs 114 which provides a local cell to the communications device 112. Both uplink and downlink communications between the UE 112 and eNB 102 (and thus the wireless telecommunications network) occur via the local cell 114. Uplink and downlink communication between the UE 112 and local cell 114 are denoted by arrows 120 and 122, respectively. In embodiments, there may be a plurality of UEs providing local cells, each of which allowing one or more others UEs to communicate with the network in the way shown in FIG. 1 with local cell 114 and UE 112.

LTE Wireless Access Interface

A brief description of the LTE wireless access interface is explained in the following paragraphs with reference to FIGS. 2 and 3 to support the explanation of the example embodiments of the present technique which are provided in the following paragraphs.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. In accordance with the present technique, the wireless access interface for both the downlink shown in FIG. 2 and the up-link shown in FIG. 3 can provide a facility for communicating data from a UE to a mobile communications network via the eNB and for communicating data to the UE from the eNB, but can also provide communications resources for performing D2D communications to another communications device without being communicated via the eNB. The down-link and the up-link of the wireless access interface of FIGS. 2 and 3 respectively will now be explained.

Figure 2:
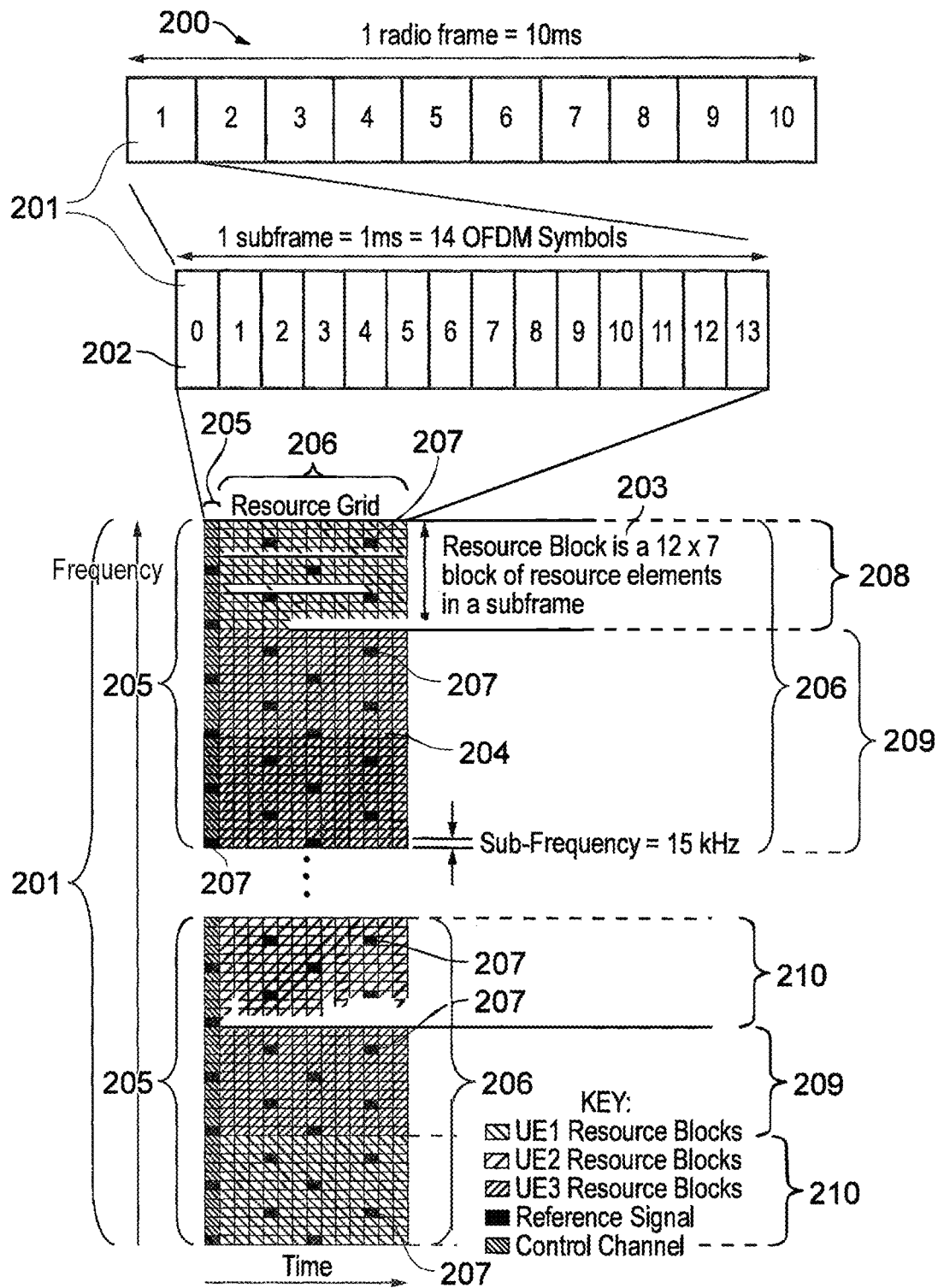
FIG. 2 provides a simplified schematic diagram of the structure of a downlink of an LTE wireless access interface.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
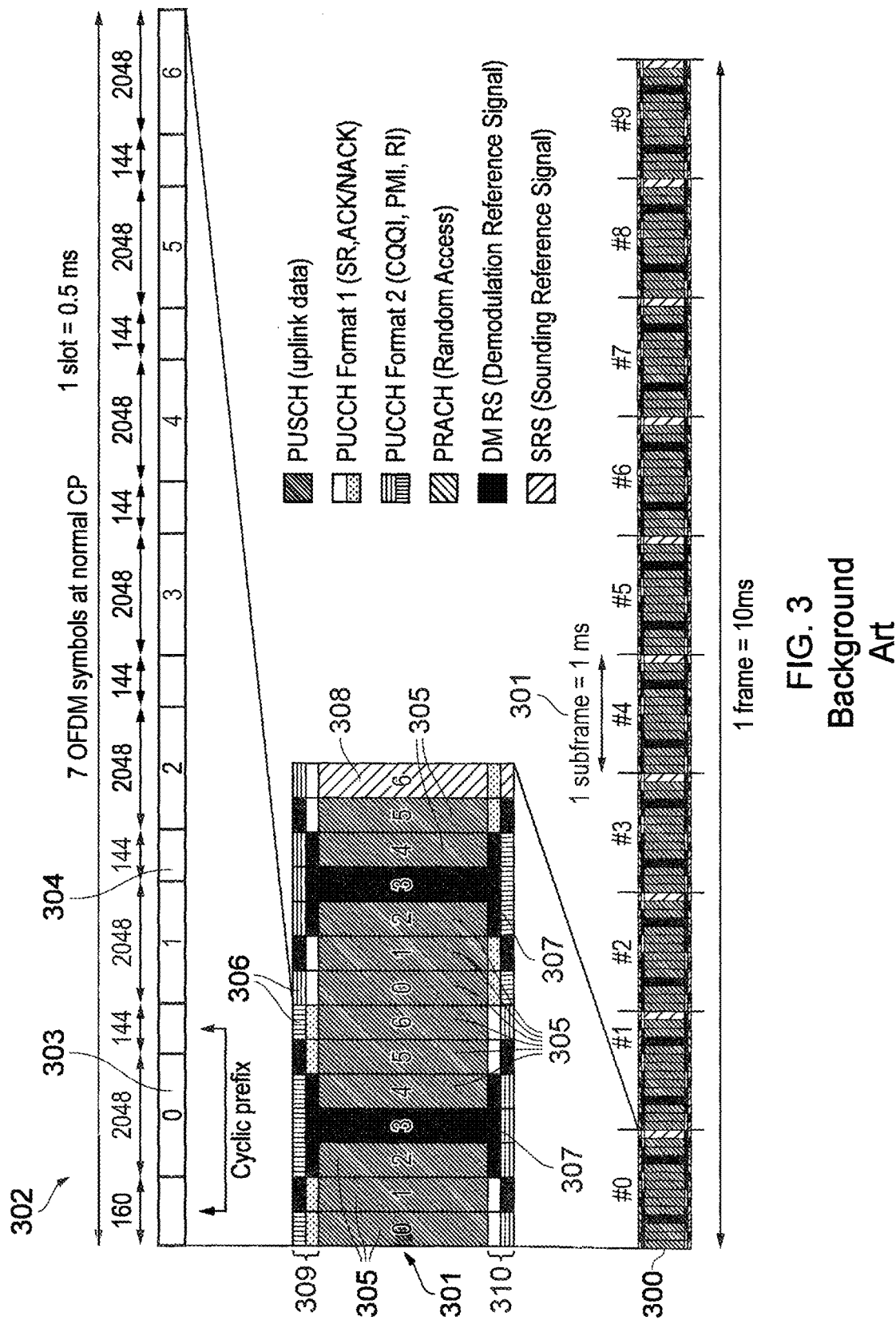
FIG. 3 provides a simplified schematic diagram of the structure of an uplink of an LTE wireless access interface.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. More details of the LTE up-link represented in FIG. 3 are provided in Annex 1.

Structure of UE, Local Cell and eNB

Figure 4:
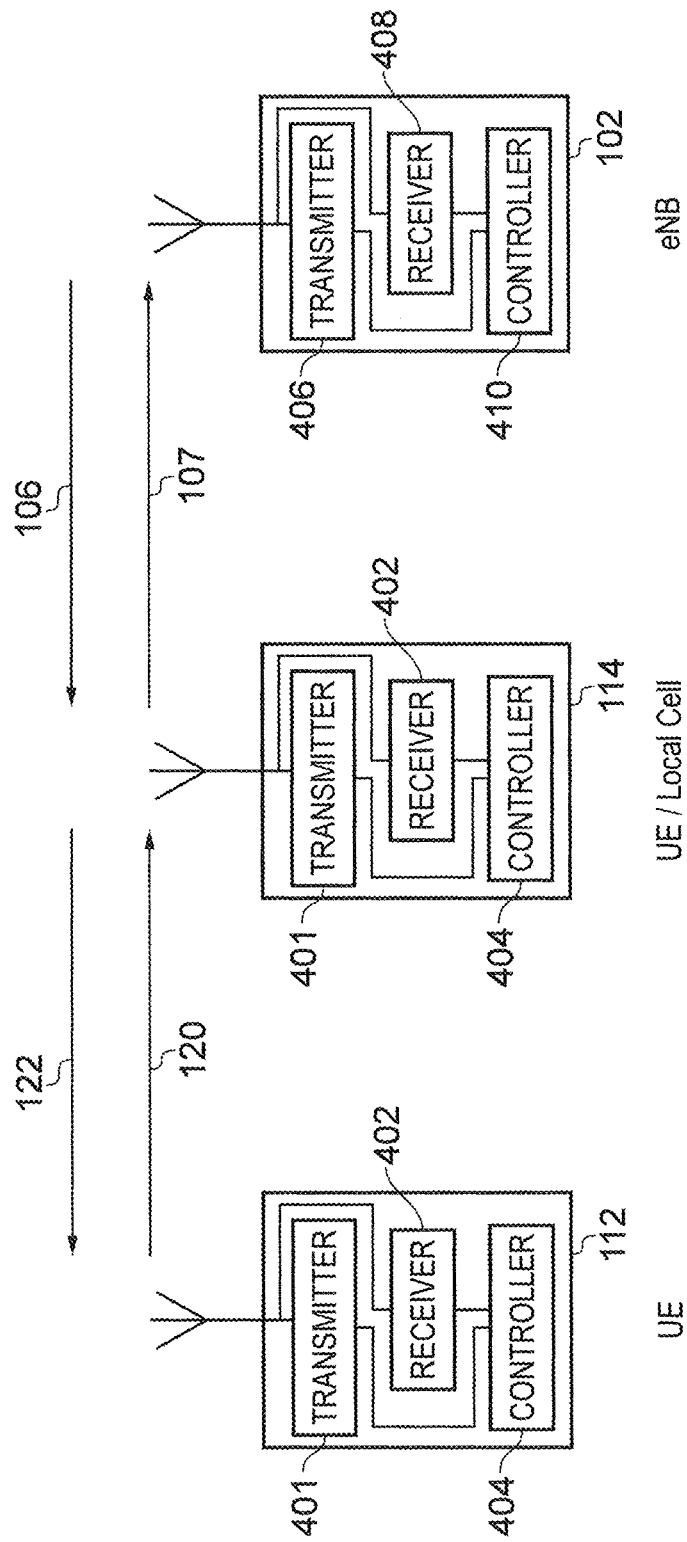
FIG. 4 shows a schematic block diagram of a communications path between a terminal device and infrastructure equipment via another terminal device providing a local cell.

FIG. 4 shows a schematic block diagram of a communications path between the UE 112 and the eNB 102 via the UE 114 providing a local cell. As shown in FIG. 4 the UE 112 includes a transmitter 401, a receiver 402 (the transmitter 401 and receiver 402 together forming a transceiver) and a controller 404 to control the transmission and reception of signals to the UE 114 providing a local cell. The up-link signals are represented by an arrow 120 which corresponds to that shown in FIG. 1 and the downlink signals are shown by an arrow 122, which corresponds to that shown in FIG. 1. The local cell UE 114 could be a conventional UE and so includes also a transmitter 401, receiver 402 (the transmitter 401 and receiver 402 together forming a transceiver) and a controller 404. The local cell UE 114 transmits signals on the uplink as shown by an arrow 107 and receives signals on the downlink as represented by an arrow 106 to and from the eNB 102, respectively. The eNB 102 includes a transmitter 406, a receiver 408 (the transmitter 406 and receiver 408 together forming a transceiver) and a controller 410 which may include a scheduler for scheduling the transmission and reception of signals on the downlink and the uplink in accordance with the wireless access interface shown in FIGS. 2 and 3.

Local Cell Group Handover

A first embodiment of the present technique provides an arrangement for managing groups of UEs which communicate with the network using a local cell (such as local cell UE).

Figure 5A:
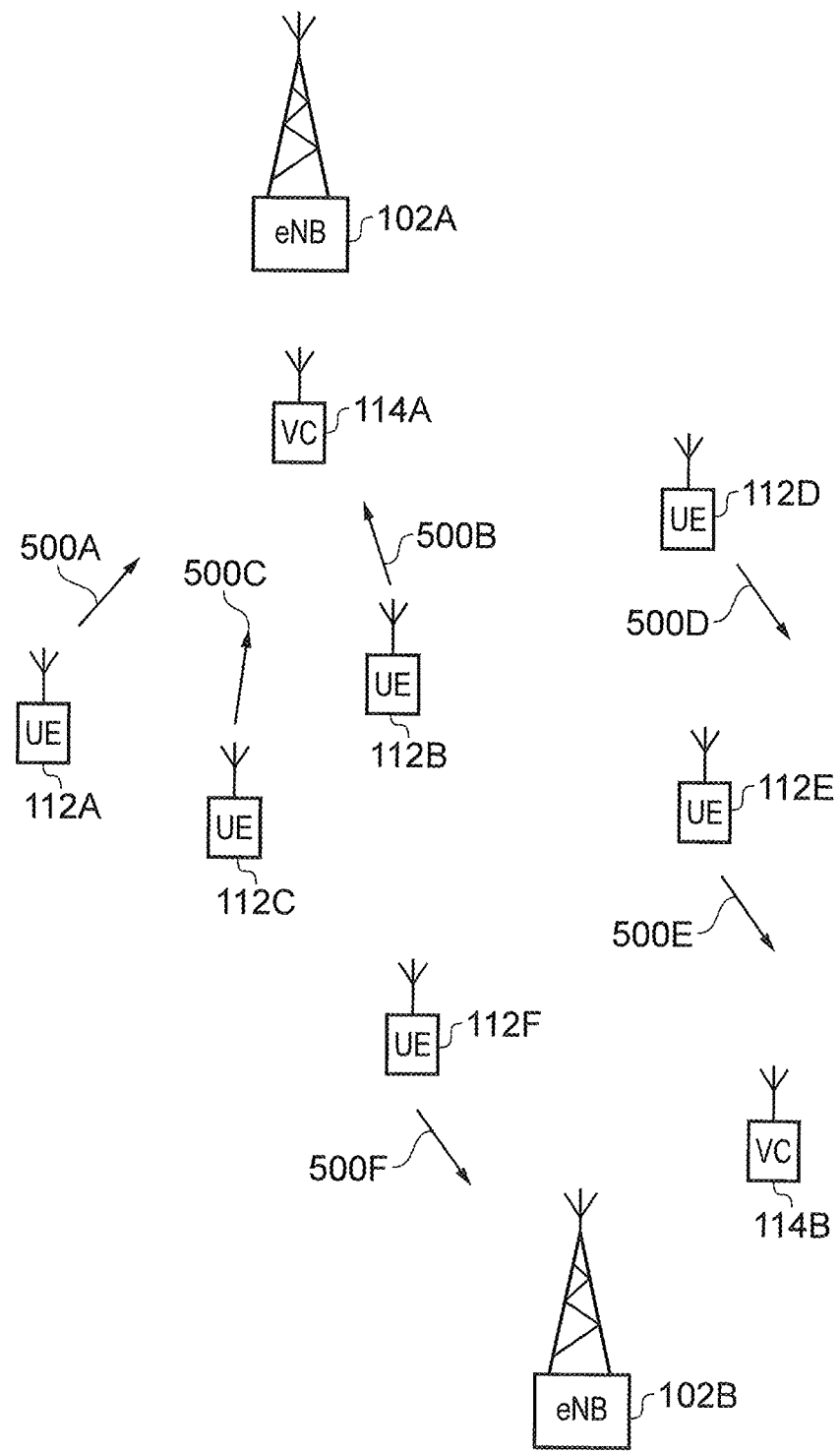
FIGS. 5A-C schematically illustrate example scenarios relating to groups of terminal devices.
Figure 5B:
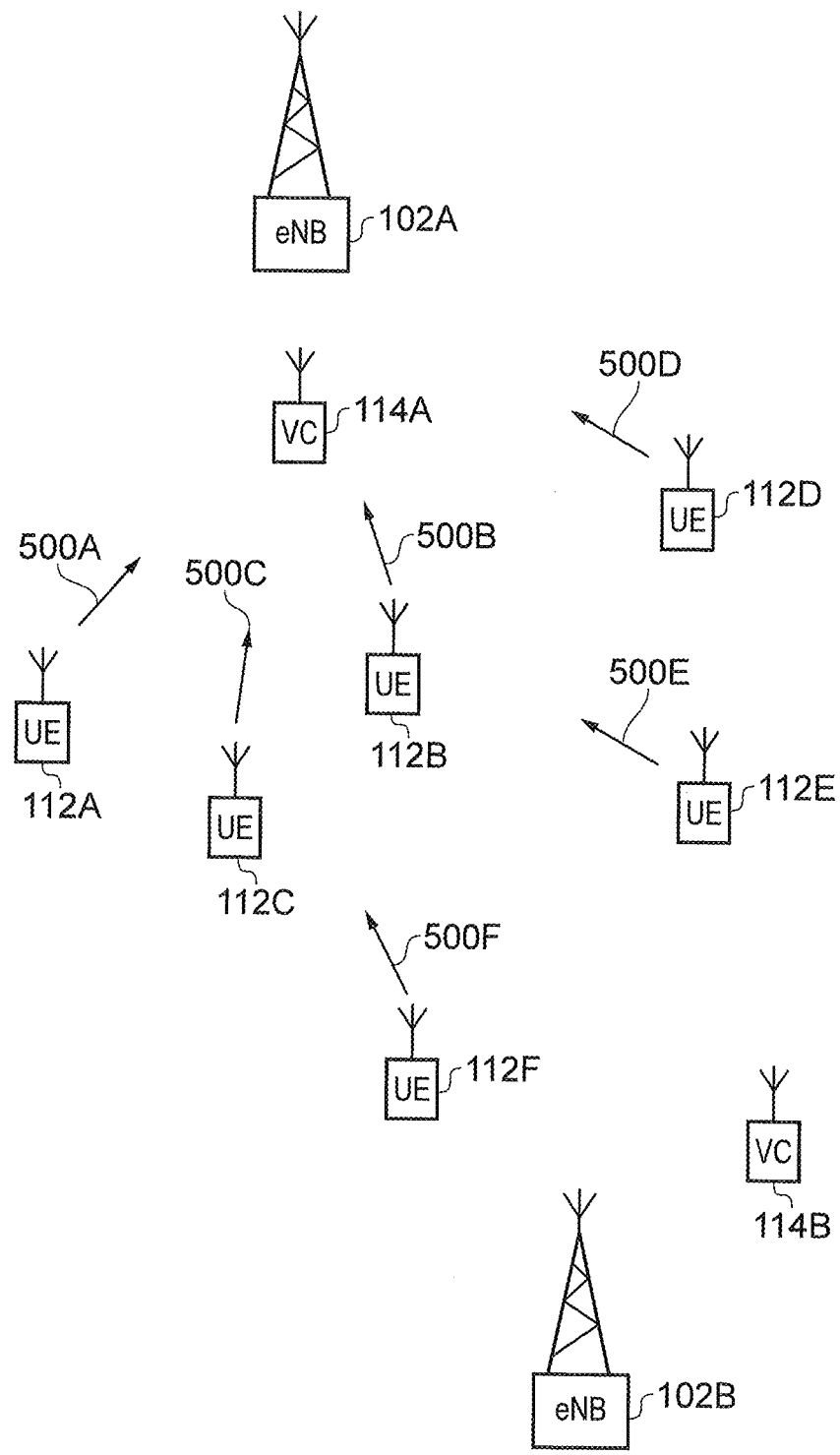
Figure 5C:
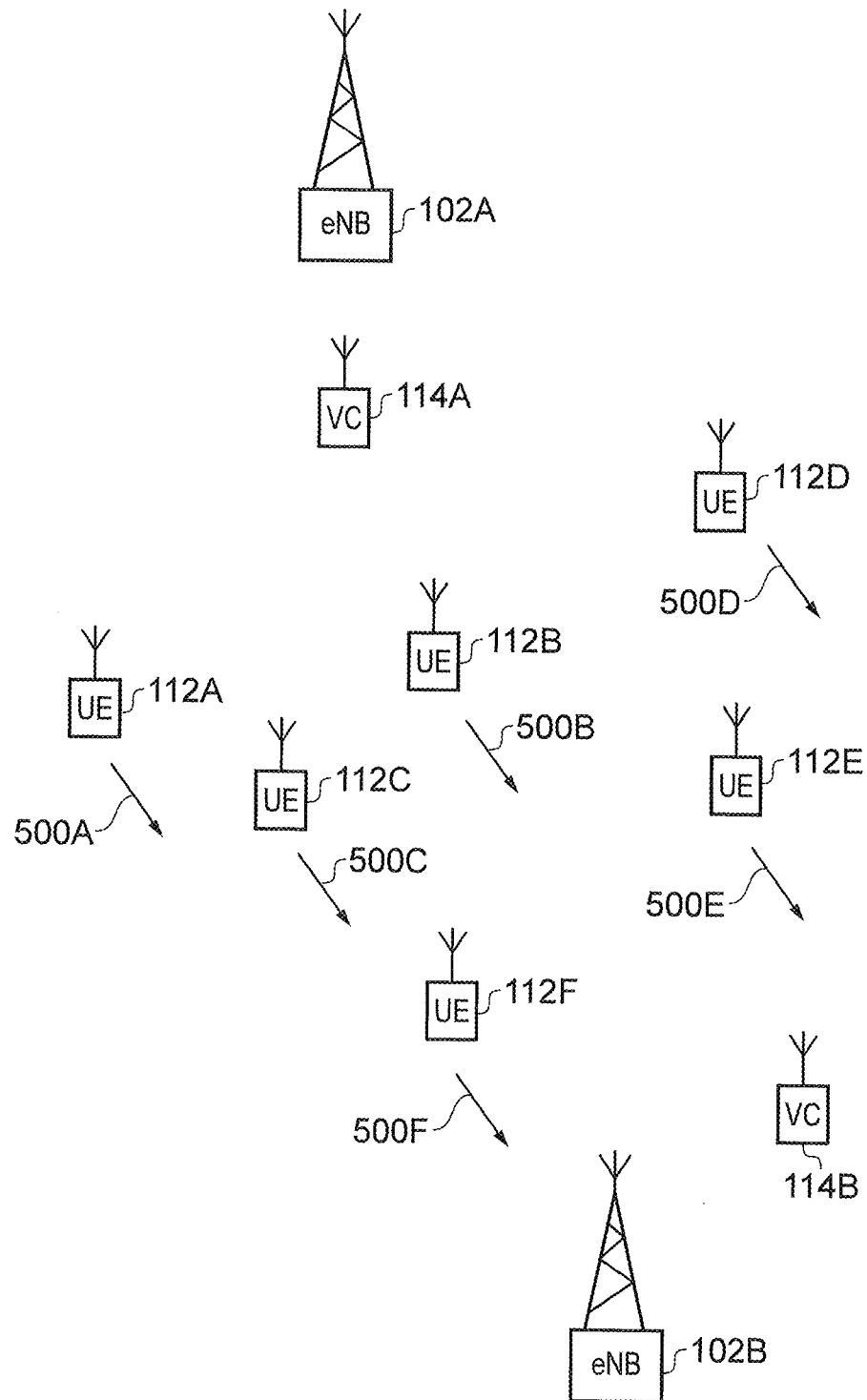

FIGS. 5A-C schematically illustrates the three example scenarios previously discussed. In particular, FIG. 5A shows the group split scenario (1), FIG. 5B shows the group merge scenario (2) and FIG. 5C shows the group moving scenario. In each of FIGS. 5A-C, there is shown a first base station 102A in communication with a first local cell 114A, a second base station 102B in communication with a second local cell 114B and six UEs 112A-F. Furthermore, each of the UEs 112A-F is shown with a respective motion vector 500A-F indicating a direction of movement of the UE.

In the group split scenario shown in FIG. 5A, each of the UEs 112A-C is moving towards the local cell 114A and each of the UEs 112D-F is moving away from the local cell 114A. The local cell 114A is a stationary (or approximately stationary) local cell located at a subway station for example, and the UEs 112A-C are being carried by passengers entering the subway station where as the UEs 112D-F are being carried by passengers leaving the subway station. In this case, in order to maintain effective communication with the network for all the UEs 112A-F, it is desirable for the UEs 112A-C to become a distinct group of UEs communicating with the network via local cell 114A and for the UEs 112D-F to become another distinct group of UEs communicating with the network using another network node (such as local cell 114B or even eNB 102B).

In the group merge scenario shown in FIG. 5B, each of the UEs 112A-F is moving towards the local cell 114A. For example, the UEs 112A-F may be being carried by passengers entering the subway station within which the local cell 114A is located. In this case, in order to maintain effective communication with the network for all the UEs 112A-F, it is desirable for all the UEs 112A-F to become a single group of UEs communicating with the network via local cell 114A. Thus, for example, if UEs 112A-C are currently communicating with the network via local cell 114A whilst UEs 112D-F are currently communicating with the network via another network node (such as local cell 114B or eNB 102B), then it is desirable for the UEs 112D-F to stop communicating with the network via this other network node and to instead communicate with the network using the local cell 114A. This results in all UEs 112A-F forming a single group and communicating with the network via the same local cell 114A.

In the group moving scenario shown in FIG. 5C, each of the UEs 112A-F is moving away from the local cell 114A. For example, the UEs 112A-F may be being carried by passengers leaving the subway station within which the local cell 114A is located. In this case, in order to maintain effective communication for all the UEs 112A-F as they move away from the local cell 114A, it is desirable for each of the UEs 112A-F to stop communicating with the network via the local cell 114A and to begin communicating with the network via another network node (such as the local cell 114B or eNB 102B). This results in each of the UEs 112A-F changing the network node via which they communicate with the network but remaining as part of the same group.

It is noted that, in the context of the present embodiment, the term "group" refers to a selection of one or more UEs from a set of UEs all communicating with the network via the same network node. The network node via which a particular UE communicates with the network may be referred to as the serving network node for that UE.

Thus, it can be seen that in each of the above-mentioned scenarios, the most appropriate serving network node must be determined for each UE or UE group. Furthermore, once the most appropriate serving network node has been determined, and it is found that the most appropriate serving network node is not the current serving local cell, handover from the current serving local cell to the newly determined serving network node must be implemented. An arrangement for determining the most appropriate serving network node and implementing handover is provided by the present embodiment.

The most appropriate serving network node for a particular UE can be determined by the current serving local cell or serving eNB of that UE on the basis of signal measurements from various network nodes in the vicinity of the UE. Specifically, each UE may measure a characteristic of a signal from each network node in its vicinity (for example, a Reference Signal Received Power (RSRP) or a Reference Signal Received Quality (RSRQ) associated with each network node), and report the measurements to the current serving local cell or serving eNB. A decision on the most appropriate serving network node can then be made on the basis of this measurement report.

For the measurement reporting, it is not only the best measurement results (relating, for example, to network nodes for which the highest RSRP values are measured) which will be reported, but also the worst ones (this may be useful for determining which UEs should be left with the current serving local cell during a group split scenario, for example) and equal or similar ones (this may be useful for a group merge scenario, for example). For example, consider a group split scenario in which hypothetical UEs A, B, C, D are within the group of local cell 1. UEs A and B are determined to each have a good link quality with local cell 2, but UEs C and D are determined to have the worst link quality with local cell 2 (out of all the local cells in range of UEs C and D). UEs A and B will thus be split from the local cell 1 group. As another example, consider a group merge scenario in which one group of hypothetical UEs A and B are communicating with local cell 1 and another group of hypothetical UEs C and D are communicating with local cell 2. If the link quality of UEs C and D with local cell 1 is similar to that with local cell 2, then the two groups could be merged. The measurement report will be sent to the current serving local cell from a UE. The current serving local cell may then make a decision as to whether or not to initiate a handover operation to a different serving network node, or may combine the measurement reports of its UEs and send the combined report to its associated eNB for the eNB to make the decision and initiate the handover.

Other information can also be indicated with the measurement report (either as part of the measurement report or as a separate report) to the current serving local cell by the UEs in the group in order for the most appropriate serving network node for each UE to be determined. In particular, assistant information relating to, for example, the moving speed and/or direction of each UE, and/or identified UE behaviour (for example, on a train, in a subway, on the way to the office, etc.) may be fed back to local cell and/or eNB in order for the most appropriate serving network node for each UE to assist in the determination of the most appropriate network node. It is noted that a determination of the most appropriate network node and the decision to handover to that network node may be referred to as a handover decision.

In some embodiments (relating to, for example, group split or group merge scenarios), the handover decision is made by a local cell. For example, an initial serving local cell (source local cell) may decide which UEs in its group are to be handed over to a new serving local cell (target local cell) and which UEs group will stay. This decision (including the new serving local cell to which the leaving UEs are to be handed over) is made on the basis of the measurement reports received from each UE in the group. Once the decision has been made, the source local cell will notify the target local cell of the group information indicative of the group of UEs to be handed over. The target local cell will then undertake admission control and prepare radio resource accordingly. If necessary, the target local cell may ask its associated eNB to re-allocate resources for use in communicating with the handed over UEs. In some cases, the target local cell will only accept a subset of the UEs initially identified for handover (as may occur, for example, if the target local cell does not have capacity to take all the identified UEs). In such a scenario, both the source and target local cell may decide which subset of the group of UEs will be handed over according to a suitable characteristic associated with group of UEs (such as the data traffic associated with each UE, Quality of Service (QoS) requirements of each UE, etc.). After receiving the confirmation from the target local cell that it is able to accept the group of UEs identified for handover (or at least a subset of the group), the source local cell then issues a handover command to each UE identified for handover.

In other embodiments (relating to, for example, group moving, group merge or inter-eNB local cell handover), the handover decision is made by an eNB. For example, the eNB will decide which UEs associated with a particular source local cell will be handed over (and to which target local cell) based on the measurement report of each UE received by the source local cell (or even received directly from each UE). The eNB will then notify the group information indicative of the group of UEs to be handed over to the target local cell, and re-allocate resources for the group if necessary. For the case of inter-eNB local cell handover (when the source and target local cells are connected to different eNBs), the source eNB will notify the group information to the target eNB. If the target local cell accepts the group handover, then the eNB will notify the source local cell to send the handover command or the eNB will send the handover command by itself.

The handover command and corresponding configuration (that is, the common information for all UEs in RRCConnectionReconfiguration message including MobilityControlInformation) will be sent to the UEs in the group to be handed over in a groupcast-like manner. For example, a specific group Radio Network Temporary Identifier (RNTI) will be allocated. For the specific UE information, a new UE identifier (UE-ID) and dedicated Random Access Channel (RACH) preamble (if necessary) will be sent to each UE individually, for example.

Some examples are now given for identifying a group of UEs that need to be handed over.

In one example, link quality differentiation can be used. In this case, a source local cell or eNB may configure the measurement of neighbouring local cells or cells by each UE. For example, from the measurement report, it may be determined that some UEs have a good link with the current serving local cell while the others have a bad link with the current serving local cell. Similarly, it may be determined that some UEs have a good link with a particular potential target local cell while the others have a bad link with that particular potential target local cell. The link quality may be determined by each UE on the basis of a measured link quality (for example, RSRP or RSRQ) of each neighbouring local cell, for example. By reviewing the measurement reports from each UE connected to the source local cell, the most appropriate local cell for each UE may be determined and handover may be initiated as appropriate. Handover may result in, for example, the UEs with a good link quality with a particular local cell forming a group connected to that local cell while the other UEs with bad link quality form one or more other groups connected to one or more other local cells.

In another example, UEs within a certain proximity to each other (as determined by a predetermined proximity threshold, for example) and with a similar direction of movement will form a group. These UEs are then handed over, at the same time, between appropriate local cells as the group moves. As the group moves, the link quality for each UE in the group associated with the source local cell will become continuously weaker over a predetermined time period where as the link quality associated with an appropriate target local cell will become continuously stronger over that predetermined time period. The source local cell or eNB may then initiate handover to the determined target local cell, when appropriate.

In another example, a target local cell is determined through one or more behaviour identification technologies so that UEs exhibiting the same behaviour will be grouped. For example, with a behaviour identification technology which is able to determine whether or not a particular UE is on a train, UEs on the train will be included in a first group (with a first local cell) where as UEs not on the train (but instead, on the platform, for example) will be included in a second group.

Each UE will be triggered to send its measurement report to its serving local cell based on a predetermined trigger event (for example, the elapse of a predetermined period of time or a certain change in the measurements related to each local cell or cell in the vicinity of the UE). In the case that it is the eNB which makes the handover decision, the local cell will a send combined measurement report. The combined measurement report may indicate, for example, the signal measurement reports (or a subset of the signal measurement reports) of each individual UE, speed and/or direction characteristics of the UEs relative to the current serving local cell (including, for example, average speed and/or direction of the group relative to the current serving local cell) and/or group behaviour of the UEs (indicative of, for example, whether the group of UEs are getting on or off train). In this case, because the combined measurement report is sent from the current serving local cell to the eNB (rather than each UE sending an individual measurement report to the eNB), the signaling between each individual UE and eNB will be reduced.

The assistant information which may be included with the measurement report (either as part of the measurement report or as a separate report) provided to the current serving local cell by each UE is used to assist in the group handover decision. Examples of assistant information include the location of each UE (as determined by Global Navigation Satellite System (GNSS) or as determined relative to the current serving local cell on the basis of the link quality for each UE, for example), the direction in which each UE is traveling relative to the current local cell (as determined on the basis of whether the link quality becomes continuously stronger (indicating that the UE is moving towards the local cell) or continuously weaker (indicating that the UE is moving away from the local cell) over a predetermined time period), and user behaviour associated with each UE (such as whether the UE is entering or leaving a train, for example). In one embodiment, the assistant information could also be carried in a discovery message transmitted by each UE to local cells within its vicinity (this may occur when a UE is turned on and initially attempts to connect to the network, for example).

In addition, each local cell may transmit corresponding assistant information to UEs in its vicinity in order to aid in the selection of an appropriate local cell for each UE. For example, a local cell specifically designated for use in a subway station may broadcast information identifying that local cell as a subway station local cell (this may be implemented using a special local cell ID which is associated subway station local cells, for example). When a UE determines that it has entered the subway station, it can thus determine, from the information broadcast from the subway station local cell, that this local cell is the most appropriate. This information can be indicated in a discovery message or measurement report transmitted from that UE, and thus a connection between the UE and subway station local cell can be initiated or the UE can be handed over from its original local cell to this subway station local cell. Other local cell characteristics (such as information indicative that a local cell is located at a bus stop, has specifically been designated as a hotspot, is a fixed local cell or is a mobile local cell, for example), could also be transmitted to UEs and used in a similar way.

Based on the measurement report and assistant information (which each constitute forms of suitability information indicative of the suitability of each potential local cell or eNB to which UEs may be handed over) provided by each UE, a group of UEs will be identified and handover decision may be made. Depending on which element of the network makes the handover decision (for example, the local cell or the eNB), the signaling flow may be different.

Figure 6:
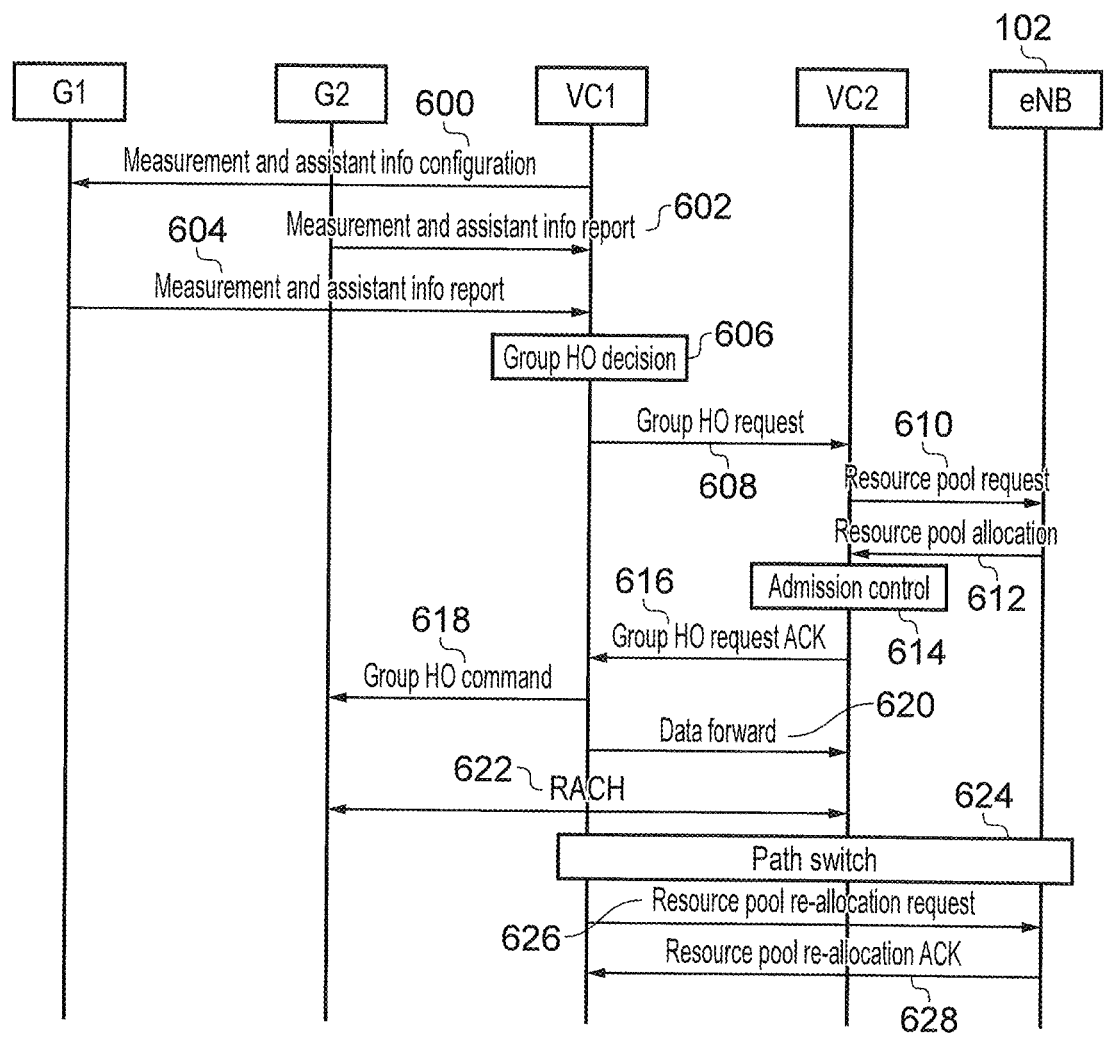
FIG. 6 schematically shows an example signaling flow in which a current serving local cell makes a handover decision.

FIG. 6 schematically shows an example signaling flow in which the current serving local cell makes the handover decision. FIG. 6 shows a group split scenario, in which, after local cell VC1 receives a measurement report from each of its connected UEs, it decides to split the UEs into two groups G1 and G2. G2 will be handed over to local cell VC2 and G1 will remain connected to local cell VC1. Both VC1 and VC2 are connected eNB 102.

At step 600, VC1 transmits measurement and assistant information configuration information to the UEs in each of the groups G1 and G2. This instructs each of the UEs in the groups G1 and G2 to transmit their respective measurement reports and assistance information to VC1, which the UEs do at steps 602 and 604. At step 606, VC1 makes a group handover decision for the group on the basis of the measurement reports and assistance information. In this case, the decision is for the UEs in group G2 to be handed over to VC2. At step 608, VC1 thus transmits a group handover request to VC2. At step 610, VC2 transmits a resource pool request to eNB 102. The resource pool request comprises a request for a pool of resources for use by VC2 in communicating with each of the UEs in group G2. At step 612, VC2 receives the resource pool allocation from the eNB 102. It is noted that if VC2 already has appropriate communication resources for use in communicating with each of the UEs in group G2, then steps 610 and 612 may be omitted. At step 614, VC2 carries out an admission control procedure and then, at step 616, transmits a group handover request acknowledgement to VC1. This informs VC1 that VC2 is able to become the serving local cell for the UEs of group G2. In response, in step 618, VC1 transmits a group handover command to each of the UEs in group G2 and, in step 620, forwards data relating to the UEs in group G2 (including data required by VC2 in establishing a connection with the UEs of group G2) to VC2. In response, at step 622, a random access channel (RACH) is established between VC2 and each of the UEs in group G2 so as to allow random access communication to be established between VC2 and the UEs. The communication path between each of the UEs in the group G2 and the network is therefore switched from being via VC1 to being via VC2 at step 624. Finally, at step 626, VC1 (which is now only providing the serving local cell for the UEs of group G1) may transmit a resource pool re-allocation request to the eNB 102. The resource pool re-allocation request indicates the resources that are no longer needed by VC1. At step 628, the eNB 102 then re-allocates these resources and transmits a resource pool re-allocation acknowledgement message back to VC1 once the re-allocation is complete. It is noted that steps 626 and 628 are optional. However, by including them, resources which are no longer needed by the source local cell VC1 are freed up for use by other elements of the network, thus providing more efficient use of network resources.

Figure 7:
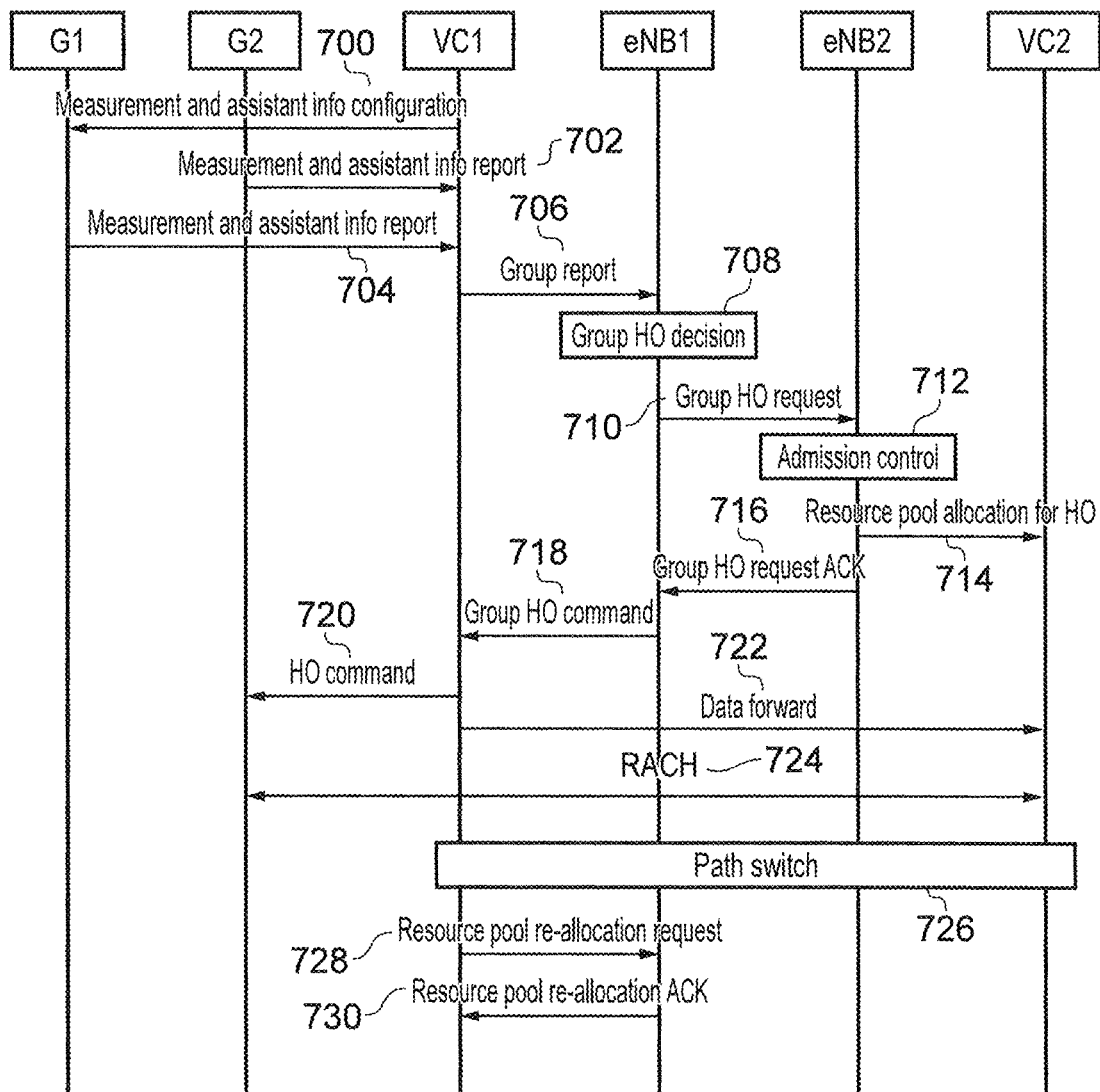
FIG. 7 schematically shows an example signaling flow in which network infrastructure equipment makes a handover decision.

FIG. 7 schematically shows an example signaling flow in which the eNB 102 makes the handover decision. FIG. 7 again shows a group split scenario, in which, after local cell VC1 receives a measurement report from each of its connected UEs, the eNB 102 decides to split the UEs into two groups G1 and G2. G2 will be handed over to local cell VC2 and G1 will remain connected to local cell VC1. In this case, VC1 is connected to a first eNB (eNB1) whilst VC2 is connected to a second eNB (eNB2).

At step 700, VC1 transmits measurement and assistant information configuration information to the UEs in each of the groups G1 and G2. This instructs each of the UEs in the groups G1 and G2 to transmit their respective measurement reports and assistance information to VC1, which the UEs do at steps 702 and 704. At step 706, the measurement reports from each UE are combined to form a combined measurement report and this is transmitted, along with the assistant information associated with each UE, to eNB. The combined measurement report and UE assistant information together form a group report, and it is this which is transmitted at step 706. At step 708, eNB1 makes a group handover decision for the group on the basis of the measurement reports and assistance information. Again, in this case, the decision is for the UEs in group G2 to be handed over to VC2. At step 710, eNB1 transmits a group handover request to eNB2 (since VC2 is connected to eNB2). eNB2 then carries out an admission control procedure at step 712 and, at step 714, allocates a resource pool to VC2 for use in communicating with each of the UEs in group G2. At step 716, eNB2 transmits a group handover request acknowledgement to eNB1. This informs eNB1 that VC2 is able to become the serving local cell for the UEs of group G2. In response, in step 718, eNB1 transmits a group handover command to VC1 which, in turn, forwards the group handover command to each of the UEs in group G2 at step 720. In step 722, VC1 then forwards data relating to the UEs in group G2 (including data required by VC2 in establishing a connection with the UEs of group G2) to VC2. This data may be forwarded directly to VC2 (in the case that signals can be exchanged directly between VC1 and VC2 without the use of eNBs) or, alternatively, may be forwarded to VC2 via eNB1 and eNB2. In response, at step 724, a random access channel (RACH) is established between VC2 and each of the UEs in group G2 so as to allow random access communication to be established between VC2 and the UEs. The communication path between each of the UEs in the group G2 and the network is therefore switched from being via VC1 to being via VC2 at step 624. Finally, at step 728, VC1 (which is now only providing the serving local cell for the UEs of group G1) may transmit a resource pool re-allocation request to eNB1. The resource pool re-allocation request indicates the resources that are no longer needed by VC1. At step 730, eNB1 then re-allocates these resources and transmits a resource pool re-allocation acknowledgement message back to VC1 once the re-allocation is complete. It is noted that, again, steps 728 and 730 are optional. However, by including them, resources which are no longer needed by the source local cell VC1 are freed up for use by other elements of the network, thus providing more efficient use of network resources.

It is noted that the handover request transmitted at step 608 and 710 may comprise, for example, group information (this being collective information relating to the group, such as the group size, group resources demand, average group moving speed, etc.), individual UE information (this being information relating to each individual UE in the group, such as RRC context information including the UE identifier, link quality with the target local cell, radio bearer context information including QoS requirement, resources demand, data traffic type, etc.) and identifiers of the target local cell (VC2) and corresponding target cell (the target cell being eNB 102 in FIG. 6, when both VC1 and VC2 are connected to the same cell, and eNB2 in FIG. 7, when VC2 is connected to eNB2).

As previously mentioned, in order for VC2 to accept the group G2, the current resource pool available to VC2 may not enough. As a result, additional resources may be allocated to it (as occurs in steps 612 and 714). The additional resources may be determined based on, for example, group information (this again being collective information relating to the group, such as the group size, group resources demand, average group moving speed, etc.). The resulting resource pool allocation message (transmitted at steps 612 and 714) may contain the additional resource pool allocation, a completely new resource pool, or the rejection of the request (in this case, it may not be possible for the group to be handed over to VC2, and thus another target local cell may need to be chosen).

The group handover request acknowledgement message transmitted at steps 616 and 716 may contain, for example, target local cell radio link reconfiguration information common to all UEs in the group G2 (such as radio resource configuration, channel configuration, target local cell system information (if any), etc.), target local cell mobility control information common to all UEs in the group G2 (such as carrier frequency, local cell ID, tracking area code, target security algorithm (if any), etc.) and UE specific information relating to the target local cell (such as a new RNTI (if any) for each UE, dedicated RACH preamble (if necessary) for each UE, etc.). Furthermore, in some cases the target local cell VC2 may only be able to accept a subset of the group G2 which is to be handed over. In such a case, the target local cell may include, in the group handover request acknowledgement message, for example, information recommending particular UEs to be accepted or may indicate a limitation of the number of UEs and (and corresponding resources) which can be expected.

The handover command transmitted from the source local cell VC1 to the group G2 at steps 618 and 720 contains relevant information from that included in the group handover request acknowledgement message. In general, the group handover command may be sent by a combination of group specific and UE specific signaling. In particular, the information in the group handover command common to all UEs in the group G2 may be transmitted to all UEs in the group G2 using a first handover information signal (the first handover information being transmitted as a groupcast message or groupcast signaling, for example). The first handover information signal includes the target local cell radio link reconfiguration information (such as radio resource configuration, channel configuration, target local cell system information (if any), etc.), and target local cell mobility control information (such as carrier frequency, local cell ID, tracking area code, target security algorithm (if any), etc.). The first handover information signal may be transmitted as a groupcast message using a specific group-RNTI allocated to the group G2, for example. Furthermore, if necessary, UE specific information (such as a new RNTI (if any) for each UE, dedicated RACH preamble for each UE (if necessary), etc.) will be sent to each respective UE in the group individually using a second handover information signal specific to each UE (this may be implemented using RRC signaling, for example). Such specific UE information may be used to implement UE differentiation according to, for example, the data traffic and QoS requirements for each UE.

As previously mentioned, in order to provide improved efficiency in network resource allocation, once the group G2 has been handed over to the target local cell VC2, the source local cell VC1 may ask its associated eNB to re-allocate the resource pool according to its current demand (as occurs at steps 626 and 728). The request may contain, for example, information regarding the UEs still being served by the source local cell VC1 (in the case of FIGS. 6 and 7, these are the UEs belonging to group G1) such as the number of such UEs, the resources demands of the group, etc. The re-allocation is then carried out (by the eNB associated with VC1) on the basis of this information.

It will thus be appreciated that in both the case that the handover decision is made by the source local cell (as exemplified in FIG. 6) and the case that the handover decision is made by an eNB (as exemplified in FIG. 7), a significant proportion of the processing for managing group handover is offloaded to the local cells of the network. The signaling and processing overhead associated with the conventional network infrastructure (in particular, at the eNBs) is thus reduced, leading to improved handover efficiency.

It will thus be appreciated that, in a first embodiment, the present technique provides a first terminal device (such as UE 114A or 114B) for exchanging signals with a wireless telecommunications network and a plurality of second terminal devices (such as UEs 112A-F). The first terminal device comprises a transceiver (such as that provided by transmitter 401 and receiver 402) configured to exchange signals with each of the plurality of second terminal devices, when the first terminal device provides a local cell for the plurality of second terminal devices, and to exchange signals with one or more infrastructure equipment (such as eNB 102A and/or 102B) of the wireless telecommunications network. The first terminal device also comprises a controller (such as controller 404) configured to control the transceiver to receive, from each of the plurality of second terminal devices served by the first terminal device when providing the local cell, suitability information indicative of the suitability of each of one or more other terminal devices or infrastructure equipment of the wireless telecommunications network to exchange signals with that second terminal device to form for that second terminal devices another local cell. The controller is configured to control the transceiver to transmit a handover command to one or more of the plurality of second terminal devices, the handover command instructing the one or more second terminal devices to exchange signals with the wireless telecommunications network via an identified more suitable local cell, if one of the one or more other terminal devices or infrastructure equipment of the wireless telecommunications network other than the first terminal device is identified as being more suitable for serving the one or more second terminal devices served by the first terminal device. Thus, for example, in the case that the first terminal device is UE 114A, then the other terminal devices or infrastructure equipment could include the UE 114B (as another terminal device) and the eNBs 102A and 102B (as infrastructure equipment). In the case that, say, the UE 114B is determined to be a more suitable local cell for one or more of the UEs 112A-F (based on the suitability information), then the UE 114A will transmit a handover command to the one or more of the UEs 112A-F instructing them to connect to the network via UE 114B instead of via UE 114A. UE 114B, in this case, becomes a local cell for these handed over UEs.

Figure 9B:
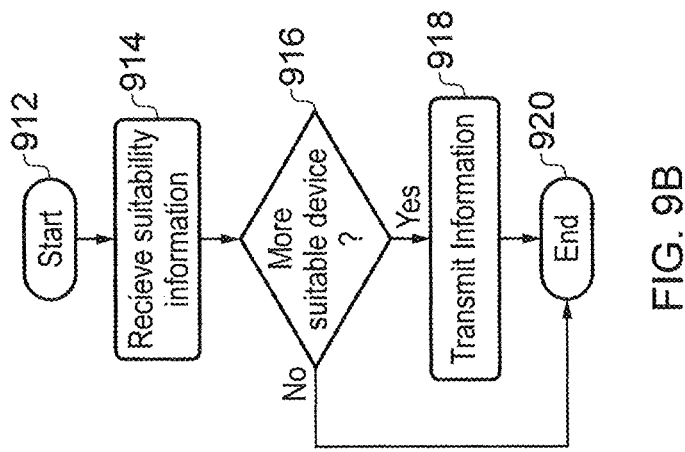
FIGS. 9A-B schematically show example processes as carried out according to a first embodiment of the present technique.
Figure 9A:
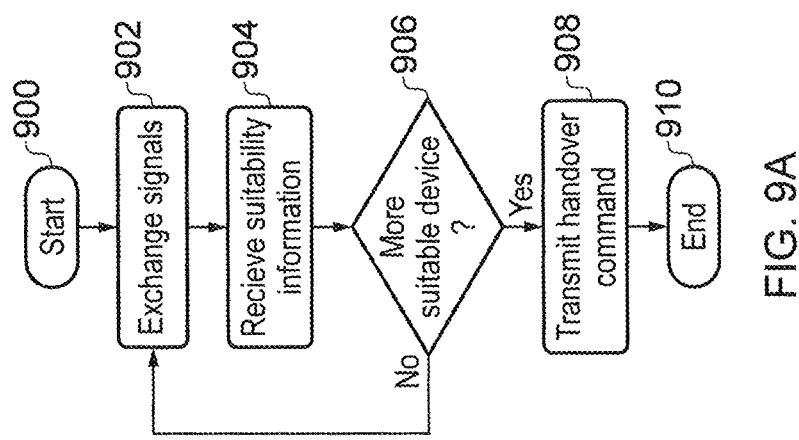

A flow chart schematically showing an example process as carried out by the controller of the first terminal device is shown in FIG. 9A. The process starts at step 900. At step 902, the transceiver is controlled to exchange signals with each of the plurality of second terminal devices, when the first terminal device provides a local cell for the plurality of second terminal devices, and to exchange signals with one or more infrastructure equipment of the wireless telecommunications network. At step 904, the transceiver is controlled to receive, from each of the plurality of second terminal devices served by the first terminal device when providing the local cell, suitability information indicative of the suitability of each of one or more other terminal devices or infrastructure equipment of the wireless telecommunications network to exchange signals with that second terminal device to form for that second terminal devices another local cell. At step 906, it is determined whether one of one or more other terminal devices or infrastructure equipment of the wireless telecommunications network other than the first terminal device is identified as being more suitable for serving one or more second terminal devices served by the first terminal device. If the determination is positive, then the process proceeds to step 908, in which the transceiver is controlled to transmit a handover command to the one or more second terminal devices, the handover command instructing the one or more second terminal devices to exchange signals with the wireless telecommunications network via the identified more suitable local cell. The process then ends at step 910. On the other hand, if the determination at step 906 is negative, then the process returns to step 902.

In one example, the transceiver of the first terminal device is configured to transmit the suitability information to infrastructure equipment of the wireless telecommunications network. The transceiver is also configured to receive, from the infrastructure equipment, information indicative of the identified more suitable local cell, in the case that one of the one or more other terminal devices or infrastructure equipment of the wireless telecommunications network other than the first terminal device is identified as being more suitable for serving the one or more second terminal devices served by the first terminal device. The controller is then configured to control the transceiver to transmit the handover command to the one or more second terminal devices in response to the transceiver receiving the information indicative of the identified more suitable local cell, the handover command comprising the information indicative of the identified more suitable local cell. Thus, in this case, it is the infrastructure equipment which makes the handover decision, as described with reference to FIG. 7, for example.

In another example, the controller is configured to determine, on the basis of the suitability information, whether one of the one or more other terminal devices or infrastructure equipment of the wireless telecommunications network other than the first terminal device is more suitable for serving the one or more second terminal devices served by the first terminal device. Thus, in this case, the first terminal device itself makes the handover decision, as described with reference to FIG. 6, for example.

In one example, the suitability information received from each of the plurality of second terminal devices served by the first terminal device comprises an indication of a radio link quality between that second terminal device and each of the one or more other terminal devices or infrastructure equipment of the wireless telecommunications network. For each second terminal device, one of the other terminal devices or infrastructure equipment with a higher radio link quality with that second terminal device is biased towards being determined as more suitable for serving that second terminal device as a local cell than one of the other terminal devices or infrastructure equipment with a lower radio link quality with that second terminal device. In other words, the better the radio link quality between a particular one of the other terminal devices or infrastructure equipment and a second terminal device, the more likely it is for that particular one of the other terminal devices or infrastructure equipment to be determined as a suitable local cell for that second terminal device. In one example, the radio link quality between each second terminal device and each of the one or more other terminal devices or infrastructure equipment is determined on the basis of an RSRP or RSRQ value as measured and reported by each of the second terminal devices.

In another example, the suitability information received from each of the plurality of second terminal devices served by the first terminal device comprises an indication of a direction of travel of that second terminal device relative to at least one of the one or more other terminal devices or infrastructure equipment of the wireless telecommunications network. For each second terminal device, one of the other terminal devices or infrastructure equipment towards which that second terminal device is traveling is biased towards being determined as more suitable for serving that second terminal device as a local cell than one of the other terminal devices or infrastructure equipment away from which that second terminal device is traveling. In other words, one of the other terminal devices or infrastructure equipment towards which a second terminal device is traveling is more likely to be determined as a suitable local cell for that second terminal device than another one of the other terminal devices or infrastructure equipment away from which that second terminal device is traveling.

Furthermore, the suitability information received from each of the plurality of second terminal devices served by the first terminal device may comprise an indication of a speed of travel of that second terminal device relative to at least one of the one or more other terminal devices or infrastructure equipment of the wireless telecommunications network. For each second terminal device, one of the other terminal devices or infrastructure equipment towards which that second terminal device is traveling with a greater speed is biased towards being (that is, more likely to be) determined as more suitable for serving that second terminal device as a local cell than one of the other terminal devices or infrastructure equipment towards which that second terminal device is traveling at lower speed. Also, for each second terminal device, one of the other terminal devices or infrastructure equipment away from which that second terminal device is traveling with a greater speed is biased towards being (that is, more likely to be) determined as less suitable for serving that second terminal device as a local cell than one of the other terminal devices or infrastructure equipment away from which that second terminal device is traveling at lower speed.

It will be appreciated that further variations on this are possible. For example, if the speed with which the second terminal device moves towards one of the other terminal devices or infrastructure equipment is too high, then that terminal device or infrastructure equipment may not be the most appropriate target network node (since this would result in overly frequent handover at this network node). There may therefore be, for example, a predetermined maximum speed with which the second terminal device moves towards one of the other terminal devices or infrastructure equipment above which that other terminal device or infrastructure equipment is not determined to be the most appropriate target network node.

It is noted that the direction and/or speed of travel of each second terminal device may be determined using any suitable method (for example, using changes in GNSS coordinates or monitoring changes in the radio link quality with respect to each of the one or more other terminal devices or infrastructure equipment of the wireless telecommunications network).

In another example, the suitability information received from each of the plurality of second terminal devices served by the first terminal device comprises a state identifier of that second terminal device, the state identifier indicating one of a plurality of predetermined possible states of that second terminal device. For each second terminal device, one of the other terminal devices or infrastructure equipment with a state identifier matching the state identifier of that second terminal device is biased towards being (that is, more likely to be) determined as a more suitable serving one of the other terminal devices or infrastructure equipment for that second terminal device than one of the other terminal devices or infrastructure equipment without a state identifier matching the state identifier of that second terminal device. For example, a state identifier may indicate one of a plurality of predetermined possible geographical locations of each second terminal device and each of the one or more other terminal devices or infrastructure equipment of the wireless telecommunications network. The plurality of predetermined possible geographical locations may be relatively simple (such as "inside subway station" and "not inside subway station", thus allowing second terminal devices to connect via a subway station-specific local cell as they enter the subway station and to connect via a different local cell as the leave the subway station, as previously discussed), or may be more complex.

It is noted that the controller of the first terminal device may use a plurality of different types of suitability information (such as the various types discussed above) simultaneously to decide on the most suitable local cell for a particular second terminal device. Each type of suitability information may have equal weightings on the decision or, alternatively, certain types of suitability information may have greater weightings on the decision than others. For example, the use of a state identifier may be given a greater weighting than the other types of suitability information (meaning that, for example, a subway station-specific local cell will still be determined as the most suitable local cell for a particular second terminal device located inside the subway station even if the other types of suitability information indicate that another local cell might be more suitable—such an arrangement may help data traffic flow, for example).

In the case that one of the one or more other terminal devices or infrastructure equipment of the wireless telecommunications network is determined to be more suitable for serving one or more of the second terminal devices served by the first terminal device, the transceiver may be configured to transmit, following transmission of the handover command to the one or more second terminal devices, a request to infrastructure equipment of the wireless telecommunications network for communication resources used by the first terminal device for exchanging signals with the handed over one or more second terminal devices to be re-allocated. The transceiver is then also configured to receive, from the infrastructure equipment, an acknowledgement message indicating that the communication resources used by the first terminal device for exchanging signals with the handed over one or more second terminal devices have been re-allocated. This is exemplified by steps 610 and 612 of FIG. 6, for example.

In a further example of the first embodiment of the present technique, there is provided infrastructure equipment (such as eNB 102A or 102B) for use with a wireless telecommunications network. The infrastructure equipment comprises a transceiver (such as that provided by transmitter 406 and receiver 408) configured to receive, from a first terminal device (such as UE 114A or 114B) of the wireless telecommunications network, the first terminal device being configured to exchange signals with each of a plurality of second terminal devices (such as UEs 112A-F) of the wireless telecommunications network, when the first terminal device provides a local cell for the plurality of second terminal devices, and to exchange signals with the infrastructure equipment, suitability information indicative of the suitability of one or more other terminal devices or infrastructure equipment of the wireless telecommunications network to exchange signals with each of the plurality of second terminal devices to form for that second terminal device another local cell. The infrastructure equipment also comprises a controller (such as controller 410) configured to determine, on the basis of the suitability information, whether one of the one or more other terminal devices or infrastructure equipment of the wireless telecommunications network is more suitable for serving one or more of the second terminal devices served by the first terminal device. In the case that one of the one or more other terminal devices or infrastructure equipment of the wireless telecommunications network is determined to be more suitable for serving one or more of the second terminal devices served by the first terminal device, the controller is configured to control the transceiver to transmit information indicative of the identified one or more other terminal devices or infrastructure equipment to the first terminal device. In this example, the infrastructure equipment thus makes the handover decision. eNB1 (as shown in FIG. 7) is an example of such infrastructure equipment.

A flow chart schematically showing an example process as carried out by the controller of the infrastructure equipment is shown in FIG. 9B. The process starts at step 912. At step 914, the transceiver is controlled to receive, from a first terminal device of the wireless telecommunications network, the first terminal device being configured to exchange signals with each of a plurality of second terminal devices of the wireless telecommunications network, when the first terminal device provides a local cell for the plurality of second terminal devices, and to exchange signals with the infrastructure equipment, suitability information indicative of the suitability of one or more other terminal devices or infrastructure equipment of the wireless telecommunications network to exchange signals with each of the plurality of second terminal devices to form for that second terminal device another local cell. At step 916, it is determined, on the basis of the suitability information, whether one of the one or more other terminal devices or infrastructure equipment of the wireless telecommunications network is more suitable for serving one or more of the second terminal devices served by the first terminal device. If the determination is positive, then the process proceeds to step 916, in which the transceiver is controlled to transmit information indicative of the identified one or more other terminal devices or infrastructure equipment to the first terminal device. The process then ends at step 920. On the other hand, if the determination at step 916 is negative, then the process simply ends at step 920 (without implementing step 918).

Contention Based Uplink Transmission in Local Cell

As previously mentioned, as well as the need to manage group handover between local cells, there is also a need for a local cell to efficiently use the communication resources made available to it for communicating with UEs in the group. At the same time, it is desirable to maintain a low communication latency with respect to the UEs.

One way of achieving this is for the UEs to use contention based (CB) transmission when transmitting signals to the local cell on the Physical Uplink Shared Channel (PUSCH). CB transmission allows multiple UEs to use the same uplink resources. The assumption is that, most of the time, two UEs will not wish to transmit PUSCH data simultaneously using those same resources, and there will therefore be no collision. When there is a collision, however, measures are taken to allow re-transmission of the data from each UE (using different resources, for example). The result is that the total number of resources dedicated for use by a particular group of UEs (together with any associated signaling) can be reduced. The cost is a small increase in communication latency in the event of a collision (since the data from each UE then needs to be re-transmitted). CB transmission as used for physical uplink shared channel (PUSCH) transmission is discussed in detail in [2], for example.

The characteristics of CB PUSCH as known include:
(1) A single set of specific resource blocks (which may be referred to as a single CB grant) is allocated to UEs for use in CB uplink transmission. At any one time, a UE that wishes to perform a CB PUSCH transmission must attempt to use this single CB grant. When two UEs attempt to perform a CB PUSCH transmission simultaneously using this single CB grant, there is a collision.
(2) The CB grant is transmitted by the eNB using the physical downlink control channel (PDCCH). All the UEs must therefore monitor the PDCCH for the CB grant. The CB grant may be transmitted either by dynamic scheduling or semi-persistent scheduling (SPS). If SPS is used, then the resource pattern of the CB grant is pre-defined with fixed periodicity and resource block (RB) allocation.
(3) There is no differentiation between UEs. Each UE has the same access probability.
(4) There is no indication on how to harmonize CB PUSCH with conventional scheduling request (SR) based PUSCH.

As previously mentioned, a local cell is usually triggered in a hot spot area (that is, an area with high levels of UE data traffic such as a subway station) or in an on-demand manner. CB uplink transmission is a suitable scheme for addressing the low latency requirement of dense areas and/or on-demand traffic. However, due to the characteristics of local cells, the use of CB PUSCH needs to be enhanced in the following ways.
(1) Collision (as occurs when more than one UE in the group tries to use the single CB grant) should be reduced as much as possible. Too much collision reduces the CB based uplink transmission performance. In general, the use of a CB UL transmission solution reduces the time spent on scheduling requests and responses. However, too many collisions will increase the delay (due to the need for UEs to re-transmit data when there is a collision). Although collisions are inevitable when using CB transmission, their occurrence should be reduced as much as possible in order to maintain system performance. There is therefore a need to reduce the amount of collision for CB based uplink transmission.
(2) The signaling from the eNB to the local cell, as well as from the local cell to each UE, should be minimized. This applies, in particular, to layer 1 signaling of the CB grant (implemented using dynamic scheduling or SPS, for example), which consumes communication resources and also increases power consumption at the local cell. It is desirable to reduce the power consumption at the local cell in order to keep it in service for as long as possible. Hence, there is a need to enhance the signaling relating to the CB UL transmission in order to reduce communication resource and/or power consumption.
(3) The CB uplink transmission from UE to local cell (access link) and from local cell to eNB (backhaul link) needs more differentiation. The importance of the backhaul link requires special dealing of the CB operation.
(4) The co-existence of CB based and scheduling request (SR) based uplink transmission should be addressed. The conventional SR based uplink transmission is necessary according to the current 3GPP standards, and therefore the harmonization of CB based and SR based uplink transmission is desirable.

By considering the above, a second embodiment of the present technique provides a CB uplink transmission arrangement for use with a local cell.

With the second embodiment, a semi-static CB grant pool containing multiple selectable CB resources is allocated for each group of UEs. This CB grant pool is specific for each group and is indicated in the control information from the local cell to the UEs of each group. The CB grant pool may be valid for a predetermined time period and could be re-configured by layer 1 CB grant signaling (as previously discussed) or layer 3 radio resource control (RRC) signaling, for example.

In one example, for every CB interval, each UE in a group which wishes to perform an uplink (UL) transmission will select one resource from the CB grant pool for the uplink transmission. The local cell will monitor the pool. If the local cell receives the UL data and successfully decode it, then an acknowledgement message (ACK) will be sent to the UE. On the other hand, if two UEs select the same resource from the CB grant pool then a collision occurs. The local cell will not be able to successfully decode the UL data due to the collision, and will therefore send no ACK. Neither UE will therefore receive an ACK from the local cell, and the UEs will thus contend for resources during the next CB interval in order to send the UL data. This process is then repeated every CB interval if configured or until all the UL data of UEs is successfully transmitted.

Thus, compared to the known arrangement in which there is a single CB grant and in which only one UE may use the resources of the single CB grant at any one time in order to avoid a collision, with the present embodiment, two UEs may simultaneously select different resources of the same CB grant pool without causing a collision. The collision rate is therefore reduced whilst still maintaining the advantages (such as reduced resource wastage and reduced SR signaling) associated with CB UL transmission.

It will be appreciated that the size of the pool is a trade off between the collision probability and resource waste. The larger the CB grant pool, the lower the collision probability for a given plurality of UEs, but the larger the potential resource waste. On the other hand, the smaller the CB grant pool, the higher the collision probability for a given plurality of UEs, but the smaller the potential resource waste.

It will also be appreciated that, in addition to the UEs connected to a particular local cell, the local cell itself may be one of a plurality of UEs and will use CB UL transmission when transmitting data to an eNB. In this case, the local cell may have a higher access probability than the other UEs (thus reducing the overall latency associated with UEs connected to the network via the local cell).

It is noted that the present embodiment also allows for the co-existence of CB and SR based uplink transmission. In particular, for each UE or local cell with CB based UL transmission, the timing relationship of the CB interval with the normal SR based UL scheduling is addressed by the present embodiment.

Various features of the present embodiment are described in more detail below.

For contention based UL transmission to the local cell, a pre-scheduling CB grant pool will be allocated. This is different from the single CB grant in conventional CB PUSCH and is also different from, for example, device-to-device (D2D) mode 2 resource allocation. The CB grant pool of the present embodiment is signaled by layer 1 signaling in a semi-static manner. The allocation/re-allocation of the pool occurs via layer 1 signaling which is similar to conventional PDCCH signaling but which is only valid for a predetermined period of time. As previously mentioned, layer 1 signaling may include dynamic scheduling (in which the CB grant pool, as defined by its size, location in time and frequency, may be changed after an interval (that is, in a semi-static manner)) or SPS (in which the CB grant pool, together with its pattern (which defines how to use the resources of the radio frame for the CB grant pool—for example, the periodicity between CB grant pool resources of the radio frame) may be changed after an interval (that is, in a semi-static manner)). Layer 3 RRC signaling is another way to configure the pool allocation/re-allocation. However, the dynamic scheduling is more suitable for the fast change of CB grant pool configuration that is used with the present embodiment.

To be more specific, after a local cell decides to use CB UL transmission with a group of UEs connected to it, configuration information will be sent from the local cell to each UE (using RRC signaling, for example) to configure the CB transmission. For example, the configuration information may include parameters such as a group identifier (group ID) for allowing each UE in the group to receive the dynamic CB grant pool allocation in the physical layer, CB interval, CB periodicity, and default release parameters (indicative of, for example, how many blank transmissions are required before the CB grant pool resources are released for other uses). These parameters are group specific and may be determined for each group, for example, on the basis of the group characteristics. After transmission of the configuration information, physical layer control signaling is sent from the local cell to each UE in the group. The physical layer control signaling comprises information indicative of the allocated CB grant pool scrambled with the group ID. The information may indicate the grant pool pattern, for example. The pattern could be flexible, continuous (as exemplified in FIG. 8A) or distributed in time and/or frequency (as exemplified in FIG. 8B). By sending a predefined pattern as the information indicative of the CB grant pool resources (rather than information identifying every CB grant pool resource, for example), the amount of physical layer control signaling is reduced. The CB grant pool configuration may then be changed, for example, in the case that there is a new data traffic amount or data traffic type for the UEs in the group.

An advantage of a distributed CB grant pool (as exemplified in FIG. 8B) is that the resulting distributed CB and SR resources provide greater flexibility for the local cell to schedule SR UEs on time and frequency blocks in accordance with, for example, the radio properties of the wireless access interface. It is noted that different types of CB grant pool pattern could be used depending on the desired characteristics of the system.

The grouping of each UE may be based on, for example, its location relative to other UEs (so that, for example, UEs close to each other belong to the same group), the uplink traffic characteristics of each UE (so that, for example, a UE with high levels of uplink traffic is grouped with other UEs with lower levels of uplink traffic, thus reducing the chance of collision), or according to the buffer status reported by the UE to the local cell.

It is noted that a similar arrangement to that described above may be implemented for a local cell when the local cell itself is one of a plurality of UEs which undertake CB based uplink transmission to an eNB. In this case, the CB grant pool will be allocated by the eNB then and a similar procedure as described above will be applied to each UE (including the local cell).

With the semi-static CB grant pool, for a given group size, the collision probability will be reduced compared with a single CB grant allocation. Furthermore, the dynamic signaling to address the grant allocation is reduced as well.

In order to reduce the chance of interference between groups (and any resulting collision), the CB grant pool is different for different groups of the same local cell. This alleviates the problem of interference for local cells, since local cells generally cover a relatively small area and thus the UE groups themselves are likely to be close to each other (thus increasing the risk of interference). On the other hand, because the eNB's coverage area is usually larger than that of a local cell, the multiplexing of the same CB grant pool among geographically separated groups of the eNB and/or of different local cells may be possible.

As previously mentioned, the size of the pool allocated to a particular UE group is a trade-off between collision probability and resource waste. Too a small pool will lead to a high collision probability that increases the latency (due to an increase in the number of UL re-transmissions) whereas too large a pool will lead to resource waste. The pool size depends on the group size as well as the data traffic demand/activity of the group. Generally, a larger pool will be allocated to larger group or to a group with a higher data traffic load. A larger pool may be provided by allocating a greater number of resources to the pool. In addition, the periodicity of the pool may be made smaller (resulting in less waiting time for a re-transmission) and/or the CB interval may be made larger. Furthermore, UEs with larger amounts of data to transmit may be reserved with more CB resources following the first successful contention (reserving CB grant resources for particular UEs is described in more detail below). The maximum number of groups in one local cell depends on the overall local cell resource size and the size of each group. In some embodiments, a limit specifying the maximum number of groups in one local cell may be implemented.

After the UEs of a particular group are notified of the CB grant pool, a UE of the group that wishes to perform a UL transmission will wait for the CB interval. For the 1st CB interval that arrives, the UE will randomly select one CB resource in the pool to transmit the data and the local cell will monitor the pool. If the local cell successfully decodes the data transmitted using the selected resource, then the local cell will treat the UE as a successful contender and send a positive response (or acknowledgement message) to the UE. Then, according to, for example, a buffer status report (if any) or certain uplink traffic characteristics, the local cell may allow the UE to continue to use further CB resources in the coming CB intervals. In other words, since the local cell knows that the UE has transmitted UL data and may therefore wish to transmit UL data again, the local cell reserves certain CB resources in the CB grant pool for future use by the UE. It is only this UE which is allowed to use the reserved CB resources, and thus the UE no longer has to contend with the other UEs in the group for these CB resources.

The simple way to reserve CB resources in the coming CB intervals is to use the CB resource at the same location in the CB interval as the CB resource originally successfully contended by the UE. Thus, for example, if a CB interval comprises a continuous row of three CB resources, and the UE successfully contends for the $1^{st}$ CB resource in the row when the $1^{st}$ CB interval arrives, then the $1^{st}$ received CB resource of a predetermined number of future CB interval rows will be reserved for use by that UE. Alternatively, CB resources may be reserved via a predetermined hopping pattern. Thus, for example, if a CB interval again comprises a continuous row of three CB resources, and the UE successfully contends for the $1^{st}$ CB resource in the row when the $1^{st}$ CB interval arrives, then when the $2^{nd}$ CB interval arrives, the $2^{nd}$ CB resource in the row may be reserved for the UE, and when the $3^{rd}$ CB interval arrives, the $3^{rd}$ CB resource in the row may be reserved for the UE. When the $4^{th}$ CB interval arrives, the $1^{st}$ received CB source is again reserved for the UE, and the pattern is repeated.

Once CB resources in future CB intervals have been reserved for a particular UE of the group, then the local cell will groupcast reservation information to all UEs in the group informing them of the CB resources that have been reserved. The reservation information may include, for example, an identifier of the UE for which the CB resources are reserved, a grant reservation period (for example, how many CB intervals the CB resources are reserved for) and information indicative of the CB resources in each CB interval which are reserved (including any grant hopping pattern, as appropriate). For the next CB interval (and until after the final CB interval for which the CB resources are reserved has been received), only the UE for which the CB resources have been reserved will attempt to transmit UL data using the reserved resources.

In the case that, during the $1^{st}$ CB interval, two UEs of the group try to transmit UL data using the same CB resource, then the local cell will be unable to decode the data carried by that CB resource. In this case, the local cell deduces that there has been a collision on this CB resource and thus sends no response (acknowledgement message). The colliding UEs will therefore receive no response. The colliding UEs therefore determine that there has been a collision and that they will therefore need to re-transmit their respective UL data. In order for the UL data of each UE to be re-transmitted, each UE must either again contend for CB resources in a future CB interval, or must transmit an SR and transmit the UL data using conventional scheduled resources. In particular, if there is no CB resource available in the next CB interval, then each UE will decide whether to send an SR and perform conventional UL data transmission or wait until a CB resource becomes available in the next CB interval. If there is a CB resource available for contention, then each UE will decide whether to give up on the contention and fall back to the conventional SR mode, or to contend the CB resource. The decision could be made according to the number of available CB resources and/or the number of potential competitors, for example. If a UE decides to again contend for a CB resource, then they will again follow the procedure detailed above.

If UEs in a group are configured to be allowed to skip the CB resources, then after several consecutive CB intervals without a UL transmission using any of the CB resources (or at least using a certain proportion of the CB resources), at least a portion of the CB grant pool may be released so that the released CB resources may be used for other things (for example, conventional PUSCH resources or CB resources for another group of UEs). If the UEs in a group are not allowed to skip the CB resources, then after several consecutive CB intervals in which padding media access control (MAC) data is received in each of the CB resources (or at least a certain proportion of the CB resources), at least a portion of the CB grant pool may be released. In either case, the number of CB intervals comprising resources which are skipped or padded with MAC data prior to release of resources from the CB grant pool may be configured by the provider of the network, for example.

For the UEs allocated with reserved CB resources, if these UEs do not have any UL data to transmit, then they may send padding MAC data to the local cell using the reserved CB resources. After the local cell receives such paddings (in one embodiment, for a predetermined number of consecutive CB intervals, as configured by the provider of the network, for example), it will groupcast the release of the previously reserved CB resources. In this case, the CB resources still belong to the CB grant pool. However, all the other UEs in the group may then contend for the released CB resources in the usual way.

The release of CB resources and reserved CB resources in the way described above leads to a more efficient use of such resources when they are no longer being used.

As previously mentioned, a local cell itself may be configured to use a CB grant pool together with other UEs in order to transmit UL data to an eNB. Since the UEs connected to the local cell depend on the local cell for their connection to the network (the local cell managing control signaling of its connected UEs, for example), the local cell may be given higher priority than the normal UEs when contending for resources in the CB grant pool. In particular, local cells who want to contend for the CB resources of the UL grand pool will have a higher access probability than normal UEs (normal UEs being those which do not provide a local cell). Furthermore, local cells which successfully contend for CB resources may be allocated more CB resource reservations (for example, more CB resources in a given CB interval, or reservations which last for a larger number of consecutive CB intervals). Also, for local cells which fail to successfully contend a CB resource, the access probability for that local cell for the next CB interval may be increased (for example, doubled). After several times of failure, the local cell may send an SR to the eNB so that conventional PUSCH resources may be scheduled for the transmission of the local cell's uplink data.

In some embodiments, there may be a need to distinguish the priorities between different local cells. For example, a hotspot local cell may have a higher priority for obtaining CB resources from the CB grant pool than a coverage extension local cell, or vice versa. The different access probabilities could be configured for different local cells by the eNB through RRC signaling, for example. A similar strategy may be applied for a group of UEs connected to a local cell. That is, one UE in the group may need to have a higher priority than the other UEs (for example, a UE belonging to emergency services personnel), and thus the access probability for different UEs in the group may be differentiated so that the higher priority UE has a greater probability of accessing CB resources of the CB grant pool than the other UEs in the group.

There are several ways in which certain UEs may be provided with a higher access probability with respect to resources of the CB grant pool. In one example, a higher access probability UE (for example, a local cell amongst normal UEs or a UE belonging to emergency services personnel, as discussed above) may be configured to attempt to transmit UL data using a plurality of resources of the CB grant pool at any one time whereas the other UEs of the group are configured to attempt to transmit UL data using only a single resource of the CB grant pool at any one time. In another example, each UE may randomly generate a number from 0 to 1 in order to determine whether to contend for a particular CB resource. In an equal access probability case with, for example, four UEs contending for a particular CB resource, each UE will randomly generate a number between 0-1. If the number generated by a particular UE is less than $\frac{1}{4}$, then that UE will attempt a transmission. On the other hand, if there is (say) a local cell requiring a higher access probability, then if the number generated by the local cell is less than $\frac{1}{2}$ (for example), it will attempt a transmission. For each of the three remaining UEs, a transmission will only be attempted if its respective generated number is less than $\frac{1}{6}$. Thus, in general, if n UEs are to have an equal access probability, then they will each randomly generate a number between 0 and 1 and will contend for a particular CB resource when the generated number is less than $1/n$. On the other hand, when one or more of then UEs are to have a greater access probability relative to the other UEs, then they will contend for a particular CB resource when the generated number is less than a number greater than $1/n$ whilst the other UEs will contend for the particular CB resource when the generated number is less than a number less than $1/n$.

The UEs in each particular group (and who are thus entitled to contend for resources in a CB grant pool allocated to that group) may also be allocated by dynamic signaling (for example, as part of the dynamic signaling which allocates the CB grant pool to each UE in the group).

In an embodiment, it is the local cell which decides the ratio between SR based and CB based resources. The local cell may decide this ratio according to, for example, its data traffic characteristics, QoS requirements, priorities, link qualities, and so on. Furthermore, in an embodiment, the same UE may be allocated to more than one group simultaneously. In this case, the UE would have more than one group identifier (that is, one identifier for each respective group to which it belongs). Such an arrangement is useful, for example, for UEs which are able to access various services. In this case, a UE may decide to contend CB resources in different groups so that, for example, resources for transmitting high volume and low latency real time data are contended for from a group with more CB resources (for example, longer interval, less periodicity) whilst resources for transmitting normal data (that is, with less volume and for which higher latency is acceptable) will be contended for from a group with less CB resources.

It will be appreciated that with the present embodiment, the use of the CB grant pool reduces the signaling overhead for each local cell and its associated UEs whilst also reducing the collision rate when compared to the use of a single CB grant.

It will thus be appreciated that, in a second embodiment, the present technique provides a terminal device (such as one of UEs 112A-F) for use with a wireless telecommunications network as one of a group of terminal devices (such as the group of UEs 112A-F). The terminal device comprises a transceiver (such as that provided by transmitter 401 and receiver 402) configured to receive information indicative of a plurality of communication resources, each of the indicated plurality of communication resources being allocated for use by the terminal devices of the group in transmitting signals to the wireless telecommunications network on a contention basis. The plurality of communication resources form a CB grant pool. The terminal device also comprises a controller (such as controller 404) configured to control the transceiver to transmit a first signal to the wireless telecommunications network using a selected one of the allocated communication resources, and to determine whether the transceiver has received an acknowledgement message from the wireless telecommunications network. If it is determined that the transceiver has received an acknowledgement message, then the controller determines that the first signal has been successfully received by the wireless telecommunications network. On the other hand, if it is determined that the transceiver has not received an acknowledgement message, then the controller controls the transceiver to re-transmit the first signal to the wireless telecommunications network. The controller is configured in combination with the transceiver to perform a random selection operation by randomly selecting the one of the allocated communications resources for transmitting the first signal from the plurality of communication resources allocated to the group of terminal devices.

A flow chart schematically showing an example process as carried out by the controller of the terminal device is shown in FIG. 10A. The process starts at step 1000. At step 1002, the transceiver is controlled to receive information indicative of a plurality of communication resources, each of the indicated plurality of communication resources being allocated for use by the terminal devices of the group in transmitting signals to the wireless telecommunications network on a contention basis. At step 1004, the transceiver is then controlled to transmit a first signal to the wireless telecommunications network using a selected one of the allocated communication resources. At step 1006, it is determined whether the transceiver has received an acknowledgement message from the wireless telecommunications network. If the determination is positive, then the process moves on to step 1008, in which it is determined that the first signal has been successfully received by the wireless telecommunications network. The process then ends at step 1012. On the other hand, if the determination at step 1006 is negative, then the process moves on to step 1010, in which the transceiver is controlled to re-transmit the first signal to the wireless telecommunications network. The process then ends at step 1012.

In one example, the transceiver is configured to receive reservation information indicative of one or more of the allocated communication resources which are reserved for use by another one of the other terminal devices in the group. The controller is configured to randomly select the one of the allocated communication resources from the allocated communication resources which are not reserved for use by another one of the terminal devices in the group. Furthermore, if it is determined that the transceiver has received an acknowledgement message, then the controller is configured to receive updated reservation information indicative of one or more of the allocated communication resources which are reserved for use by the terminal device. The transceiver is then controlled to transmit a second signal to the wireless telecommunications network using one of the communication resources reserved for use by the terminal device.

Figure 8A:
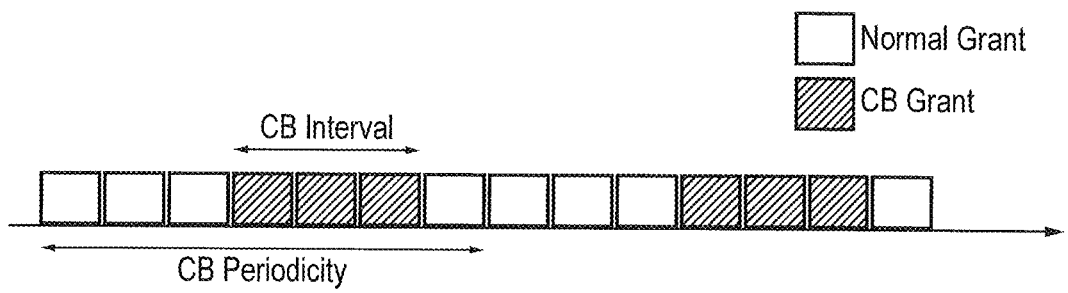
FIGS. 8A-B schematically show allocated communication resources which are periodically repeated in time over one or more consecutive radio frames.
Figure 8B:
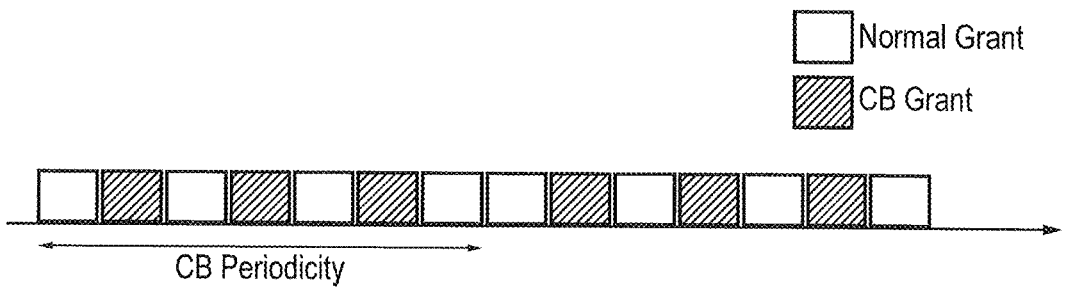

In one example, the allocated communication resources are periodically repeated in time over one or more consecutive radio frames. This is schematically illustrated in FIGS. 8A and 8B, for example. Furthermore, the one or more of the allocated communication resources reserved for use by the terminal device are reserved for a predetermined number of repeats of the allocated communication resources. The number of repeats may be included in the reservation information or, alternatively, known in advance by the controller, for example. Furthermore, the allocated communication resources may form a portion of a repeating interval of communication resources and may be distributed such that a portion of the allocated communication resources are non-consecutive communication resources in the repeating interval. Such a distributed arrangement is schematically illustrated in FIG. 8B. To be clear, here, the repeating interval of communication resources (the length of which is defined by the "CB periodicity" exemplified in FIG. 8B, not to be confused with the "CB interval" shown in FIG. 8A, which instead defines the length of a continuous row of allocated resources) comprises both allocated and non-allocated communication resources. The non-allocated communication resources are available for use by any UE (using conventional scheduling, for example), and thus such a distributed arrangement allows greater flexibility in the use of the repeating interval of communication resources, as previously explained.

In one example, in the case that no signal has been received via at least a portion of the allocated communication resources for more than a predetermined number of consecutive repeats of the allocated communication resources, the transceiver is configured to receive information indicating that at least the portion of the allocated communication resources is available for use by other terminal devices. Furthermore, in another example, in the case that no signal has been received via at least a portion of the one or more of the allocated communication resources reserved for use by the terminal device for more than a predetermined number of consecutive repeats of the allocated communication resources, the transceiver is configured to receive information indicating that at least the portion of the one or more reserved communication resources is available for use by the other terminal devices of the group in transmitting signals to the wireless telecommunications network on a contention basis.

In one example, in order to re-transmit the first signal to the wireless telecommunications network, the controller is configured to perform a further random selection operation to randomly select one of the allocated communication resources and control the transceiver to re-transmit the first signal to the wireless telecommunications network using the further selected communication resource. In another example, the first signal may be re-transmitted using conventional scheduled resources.

In a further example of the second embodiment of the present technique, there is provided a terminal device (such as UE 114A or 114B) for use with a wireless telecommunications network. The terminal device comprises a transceiver (such as that provided by transmitter 401 and receiver 402) configured to transmit information indicative of a plurality of communication resources, each of the indicated plurality of communication resources being allocated for use by each of the terminal devices in a group of terminal devices (such as the group of terminal devices 112A-F) in transmitting signals to the wireless telecommunications network via the terminal device on a contention basis, when the terminal device provides a local cell for the group of terminal devices. The terminal device comprises a controller configured to monitor the allocated communication resources for signals received at the transceiver from the terminal devices of the group, the monitoring comprising performing an operation (such as decoding) with respect to each of the allocated communication resources to determine whether a signal has been received by the transceiver via that communication resource from a single identified one of the terminal devices of the group. If it is determined that a signal has been received by the transceiver via one of the allocated communication resources from a single identified one of the terminal devices of the group, then the transceiver is controlled to transmit an acknowledgement message to the identified terminal device and transmit, to each of the terminal devices in the group, reservation information indicative of one or more of the allocated communication resources which are reserved for use by the identified terminal device.

In one example, the allocated communication resources are periodically repeated in time over one or more consecutive radio frames. Again, this is schematically illustrated in FIGS. 8A and 8B, for example. Each repeat of the allocated communication resources is monitored by the controller, and the one or more of the allocated communication resources reserved for use by the identified terminal device are reserved for a predetermined number of repeats of the allocated communication resources. Again, the number of repeats may be included in the reservation information or, alternatively, known in advance by the controller, for example. The allocated communication resources may form a portion of a repeating interval of communication resources and may distributed such that a portion of the allocated communication resources are non-consecutive communication resources in the repeating interval (as exemplified in FIG. 8B, as previously discussed).

In one example, the controller is configured to monitor the allocated communication resources for signals received from the terminal devices of the group. The monitoring comprises performing an operation (such as decoding) with respect to each of the allocated communication resources to determine whether a signal has been received by the transceiver via that communication resource from any of the terminal devices of the group. If it is determined that no signal has been received via at least a portion of the allocated communication resources for more than a predetermined number of consecutive repeats of the allocated communication resources, then the transceiver is controlled to transmit information indicating that at least the portion of the allocated communication resources is available for use by other terminal devices. Furthermore, in another example, the controller is configured to monitor the one or more of the allocated communication resources reserved for use by the identified terminal device, the monitoring comprising performing an operation (such as decoding) with respect to each of the one or more reserved communication resources to determine whether a signal has been received via that communication resource from the identified terminal device. If it is determined that no signal has been received via at least a portion of the one or more reserved communication resources for more than a predetermined number of consecutive repeats of the allocated communication resources, then the transceiver is controlled to transmit information indicating that at least the portion of the one or more reserved communication resources is available for use by the other terminal devices of the group in transmitting signals to the wireless telecommunications network on a contention basis.

A flow chart schematically showing an example process as carried out by the controller of the terminal device is shown in FIG. 10B. The process starts at step 1014. At step 1016, the transceiver is controlled to transmit information indicative of a plurality of communication resources, each of the indicated plurality of communication resources being allocated for use by each of the terminal devices in a group of terminal devices in transmitting signals to the wireless telecommunications network via the terminal device on a contention basis, when the terminal device provides a local cell for the group of terminal devices. At step 1018, the allocated communication resources are monitored for signals received at the transceiver from the terminal devices of the group, the monitoring comprising performing an operation (such as decoding) with respect to each of the allocated communication resources to determine whether a signal has been received by the transceiver via that communication resource from a single identified one of the terminal devices of the group. At step 1020, it is determined whether a signal has been received by the transceiver via one of the allocated communication resources from a single identified one of the terminal devices of the group. If the determination is positive, then the transceiver is controlled to transmit an acknowledgement message to the identified terminal device (step 1022) and transmit, to each of the terminal devices in the group, reservation information indicative of one or more of the allocated communication resources which are reserved for use by the identified terminal device (step 1024). The process then ends at step 1026. On the other hand, if the determination at step 1020 is negative, then the process returns to step 1018.

It will be appreciated that the various processes carried out by the transceiver and controller of the terminal device (such as UE 114A or 114B) which provides a local cell may also be carried out by infrastructure equipment. In other words, in a further example of the second embodiment, there may be provided infrastructure equipment for use with a wireless telecommunications network, the infrastructure equipment comprising a transceiver (such as that provided by transmitter 406 and receiver 408) and a controller (such as controller 410). The transceiver is configured to transmit information indicative of a plurality of communication resources, each of the indicated plurality of communication resources being allocated for use by each of the terminal devices in a group of terminal devices (such as the group of terminal devices 112A-F) in transmitting signals to the wireless telecommunications network via the infrastructure equipment on a contention basis. The controller is configured to monitor the allocated communication resources for signals received at the transceiver from the terminal devices of the group, the monitoring comprising performing an operation with respect to each of the allocated communication resources to determine whether a signal has been received by the transceiver via that communication resource from a single identified one of the terminal devices of the group. If it is determined that a signal has been received by the transceiver via one of the allocated communication resources from a single identified one of the terminal devices of the group, then the controller controls the transceiver to transmit an acknowledgement message to the identified terminal device and transmit, to each of the terminal devices in the group, reservation information indicative of one or more of the allocated communication resources which are reserved for use by the identified terminal device.

Such infrastructure equipment thus works in exactly the same way as a local cell terminal device (such as UE 114A or 114B) in terms of indicating a CB grant pool to a group of terminal devices, monitoring the resources of the CB grant pool for signals transmitted by one or more of the group of terminal devices and reserving resources of the CB grant pool. It will be appreciated that each of the described features of the transceiver and controller of a local cell terminal device may also be implemented by the transceiver and controller of such infrastructure equipment. The CB grant pool of the second embodiment may thus be used with a group of terminal devices no matter whether those terminal devices are connected to the network via a local cell or via direct communication with infrastructure equipment (such as an eNB).

Various features of embodiments of the present technique are defined by the following numbered clauses:

1. A first terminal device for exchanging signals with a wireless telecommunications network and a plurality of second terminal devices, the first terminal device comprising:

a transceiver configured to exchange signals with each of the plurality of second terminal devices, when the first terminal device provides a local cell for providing wireless connectivity for the plurality of second terminal devices, and to exchange signals with one or more infrastructure equipment of the wireless telecommunications network, and a controller configured to control the transceiver to receive, from each of the plurality of second terminal devices served by the first terminal device when providing the local cell, suitability information indicative of the suitability of each of one or more other terminal devices or infrastructure equipment of the wireless telecommunications network to exchange signals with that second terminal device to provide for that second terminal devices another local cell; and to control the transceiver to transmit a handover command to one or more of the plurality of second terminal devices, the handover command instructing the one or more second terminal devices to exchange signals with the wireless telecommunications network via an identified more suitable terminal device or infrastructure equipment for providing a local cell, if one of the one or more other terminal devices or infrastructure equipment of the wireless telecommunications network other than the first terminal device is identified as being more suitable for serving the one or more second terminal devices served by the first terminal device.

2. A first terminal device according to clause 1, wherein:

the transceiver is configured to transmit the suitability information to infrastructure equipment of the wireless telecommunications network; and to receive, from the infrastructure equipment, information indicative of the identified more suitable terminal device or infrastructure equipment for providing a local cell, in the case that one of the one or more other terminal devices or infrastructure equipment of the wireless telecommunications network other than the first terminal device is identified as being more suitable for serving the one or more second terminal devices served by the first terminal device; and the controller is configured to control the transceiver to transmit the handover command to the one or more second terminal devices in response to the transceiver receiving the information indicative of the identified more suitable terminal device or infrastructure equipment for providing a local cell, the handover command comprising the information indicative of the identified more suitable terminal device or infrastructure equipment for providing a local cell.

3. A first terminal device according to clause 1, wherein the controller is configured to determine, on the basis of the suitability information, whether one of the one or more other terminal devices or infrastructure equipment of the wireless telecommunications network other than the first terminal device is more suitable for serving the one or more second terminal devices served by the first terminal device.

4. A first terminal device according to any preceding clause, wherein:

the suitability information received from each of the plurality of second terminal devices served by the first terminal device comprises an indication of a radio link quality between that second terminal device and each of the one or more other terminal devices or infrastructure equipment of the wireless telecommunications network; and for each second terminal device, one of the other terminal devices or infrastructure equipment with a higher radio link quality with that second terminal device is biased towards being determined as more suitable for serving that second terminal device by providing a local cell than one of the other terminal devices or infrastructure equipment with a lower radio link quality with that second terminal device.

5. A first terminal device according to any preceding clause, wherein:

the suitability information received from each of the plurality of second terminal devices served by the first terminal device comprises an indication of a direction of travel of that second terminal device relative to at least one of the one or more other terminal devices or infrastructure equipment of the wireless telecommunications network; and for each second terminal device, one of the other terminal devices or infrastructure equipment towards which that second terminal device is traveling is biased towards being determined as more suitable for serving that second terminal device by providing a local cell than one of the other terminal devices or infrastructure equipment away from which that second terminal device is traveling.

6. A first terminal device according to any preceding clause, wherein:

the suitability information received from each of the plurality of second terminal devices served by the first terminal device comprises a state identifier of that second terminal device, the state identifier indicating one of a plurality of predetermined possible states of that second terminal device; and for each second terminal device, one of the other terminal devices or infrastructure equipment with a state identifier matching the state identifier of that second terminal device is biased towards being determined as a more suitable serving one of the other terminal devices or infrastructure equipment for that second terminal device than one of the other terminal devices or infrastructure equipment without a state identifier matching the state identifier of that second terminal device.

7. A first terminal device according to clause 6, wherein the state identifier indicates one of a plurality of predetermined possible geographical locations of each of each second terminal device and each of the one or more other terminal devices or infrastructure equipment of the wireless telecommunications network.

8. A first terminal device according to any preceding clause, wherein, in the case that one of the one or more other terminal devices or infrastructure equipment of the wireless telecommunications network is determined to be more suitable for serving one or more of the second terminal devices served by the first terminal device, the transceiver is configured:

to transmit, following transmission of the handover command to the one or more second terminal devices, a request to infrastructure equipment of the wireless telecommunications network for communication resources used by the first terminal device for exchanging signals with the handed over one or more second terminal devices to be re-allocated; and to receive, from the infrastructure equipment, an acknowledgement message indicating that the communication resources used by the first terminal device for exchanging signals with the handed over one or more second terminal devices have been re-allocated.

9. A first terminal device according to any preceding clause, wherein:
the handover command transmitted to the one or more of the plurality of second terminal devices comprises group information, the group information being common to each of the one or more second terminal devices, and individual information, the individual information being specific to each of the one or more second terminal devices, and
the group information is transmitted to each of the one or more second terminal devices using a first handover information signal which is transmitted to all of the one or more second terminal devices, and the individual information is transmitted to each of the one or more second terminal devices individually using a second handover information signal specific to each of the one or more second terminal devices.

10. Infrastructure equipment for use with a wireless telecommunications network, the infrastructure equipment comprising:
a transceiver configured to receive, from a first terminal device of the wireless telecommunications network, the first terminal device being configured to exchange signals with each of a plurality of second terminal devices of the wireless telecommunications network, when the first terminal device provides a local cell for providing wireless connectivity for the plurality of second terminal devices, and to exchange signals with the infrastructure equipment, suitability information indicative of the suitability of one or more other terminal devices or infrastructure equipment of the wireless telecommunications network to exchange signals with each of the plurality of second terminal devices to provide for that second terminal device another local cell; and
a controller configured
to determine, on the basis of the suitability information, whether one of the one or more other terminal devices or infrastructure equipment of the wireless telecommunications network is more suitable for serving one or more of the second terminal devices served by the first terminal device;
in the case that one of the one or more other terminal devices or infrastructure equipment of the wireless telecommunications network is determined to be more suitable for serving one or more of the second terminal devices served by the first terminal device, control the transceiver to transmit information indicative of the identified one or more other terminal devices or infrastructure equipment to the first terminal device.

11. Infrastructure equipment according to clause 10, wherein, in the case that one of the one or more other terminal devices or infrastructure equipment of the wireless telecommunications network is determined to be more suitable for serving one or more of the second terminal devices served by the first terminal device,
the transceiver is configured to receive, from the first terminal device, following transmission of a handover command from the first terminal device to the one or more second terminal devices, the handover command instructing the one or more second terminal devices to exchange signals with the wireless telecommunications network via the identified one of the one or more other terminal devices or infrastructure equipment, a request for communication resources used by the first terminal device for exchanging signals with the handed over one or more second terminal devices to be re-allocated;
the controller is configured to, in response to the request, re-allocate the communication resources used by the first terminal device for exchanging signals with the handed over one or more second terminal devices; and
the transceiver is configured to transmit, to the first terminal device, an acknowledgement message indicating that the communication resources used by the first terminal device for exchanging signals with the handed over one or more second terminal devices have been re-allocated.

12. A method of controlling a first terminal device for exchanging signals with a wireless telecommunications network and a plurality of second terminal devices, the method comprising controlling a transceiver of the first terminal device to
exchange signals with each of the plurality of second terminal devices, when the first terminal device provides a local cell for providing wireless connectivity for the plurality of second terminal devices, and to exchange signals with one or more infrastructure equipment of the wireless telecommunications network,
receive, from each of the plurality of second terminal devices served by the first terminal device when providing the local cell, suitability information indicative of the suitability of each of one or more other terminal devices or infrastructure equipment of the wireless telecommunications network to exchange signals with that second terminal device to provide for that second terminal devices another local cell, and
transmit a handover command to one or more of the plurality of second terminal devices, the handover command instructing the one or more second terminal devices to exchange signals with the wireless telecommunications network via an identified more suitable terminal device or infrastructure equipment for providing a local cell, if one of the one or more other terminal devices or infrastructure equipment of the wireless telecommunications network other than the first terminal device is identified as being more suitable for serving the one or more second terminal devices served by the first terminal device.

13. A method of controlling infrastructure equipment for use with a wireless telecommunications network, the method comprising:
controlling a transceiver of the infrastructure equipment to receive, from a first terminal device of the wireless telecommunications network, the first terminal device being configured to exchange signals with each of a plurality of second terminal devices of the wireless telecommunications network, when the first terminal device provides a local cell for providing wireless connectivity for the plurality of second terminal devices, and to exchange signals with the infrastructure equipment, suitability information indicative of the suitability of one or more other terminal devices or infrastructure equipment of the wireless telecommunications network to exchange signals with each of the plurality of second terminal devices to provide for that second terminal device another local cell; and
determining, on the basis of the suitability information, whether one of the one or more other terminal devices or infrastructure equipment of the wireless telecommunications network is more suitable for serving one or more of the second terminal devices served by the first terminal device;

in the case that one of the one or more other terminal devices or infrastructure equipment of the wireless telecommunications network is determined to be more suitable for serving one or more of the second terminal devices served by the first terminal device, controlling the transceiver to transmit information indicative of the identified one or more other terminal devices or infrastructure equipment to the first terminal device.

14. A wireless telecommunications system comprising a terminal device according to any one of clauses 1 to 9 and infrastructure equipment according to clause 10 or 11.

15. A terminal device for use with a wireless telecommunications network as one of a group of terminal devices, the terminal device comprising:

a transceiver configured to receive information indicative of a plurality of communication resources, each of the indicated plurality of communication resources being allocated for use by the terminal devices of the group in transmitting signals to the wireless telecommunications network on a contention basis; and a controller configured to control the transceiver to transmit a first signal to the wireless telecommunications network using a selected one of the allocated communication resources;

to determine whether the transceiver has received an acknowledgement message from the wireless telecommunications network;

if it is determined that the transceiver has received an acknowledgement message, determine that the first signal has been successfully received by the wireless telecommunications network; and if it is determined that the transceiver has not received an acknowledgement message, control the transceiver to re-transmit the first signal to the wireless telecommunications network, wherein the controller is configured in combination with the transceiver to perform a random selection operation by randomly selecting the one of the allocated communications resources for transmitting the first signal from the plurality of communication resources allocated to the group of terminal devices.

16. A terminal device according to clause 15, wherein:

the transceiver is operable to receive reservation information indicative of one or more of the allocated communication resources which are reserved for use by another one of the other terminal devices in the group;

the controller is configured to randomly select the one of the allocated communication resources from the allocated communication resources which are not reserved for use by another one of the terminal devices in the group; and if it is determined that the transceiver has received an acknowledgement message, then the controller is configured to receive updated reservation information indicative of one or more of the allocated communication resources which are reserved for use by the terminal device, and control the transceiver to transmit a second signal to the wireless telecommunications network using one of the communication resources reserved for use by the terminal device.

17. A terminal device according to clause 16, wherein the allocated communication resources are periodically repeated in time over one or more consecutive radio frames, and the one or more of the allocated communication resources reserved for use by the terminal device are reserved for a predetermined number of repeats of the allocated communication resources.

18. A terminal device according to clause 17, wherein the allocated communication resources form a portion of a repeating interval of communication resources and are distributed such that a portion of the allocated communication resources are non-consecutive communication resources in the repeating interval.

19. A terminal device according to clause 17 or 18, wherein, in the case that no signal has been received via at least a portion of the allocated communication resources for more than a predetermined number of consecutive repeats of the allocated communication resources, the transceiver is configured to receive information indicating that at least the portion of the allocated communication resources is available for use by other terminal devices.

20. A terminal device according to any one of clauses 17 to 19, wherein, in the case that no signal has been received via at least a portion of the one or more of the allocated communication resources reserved for use by the terminal device for more than a predetermined number of consecutive repeats of the allocated communication resources, the transceiver is configured to receive information indicating that at least the portion of the one or more reserved communication resources is available for use by the other terminal devices of the group in transmitting signals to the wireless telecommunications network on a contention basis.

21. A terminal device according to any one of clauses 15 to 20, wherein, in order to re-transmit the first signal to the wireless telecommunications network, the controller is configured to:

perform a further random selection operation to randomly select one of the allocated communication resources; and control the transceiver to re-transmit the first signal to the wireless telecommunications network using the further selected communication resource.

22. A terminal device according to any one of clauses 15 to 20, wherein the controller is configured in combination with the transceiver to perform the random selection operation in accordance with an access probability associated with the terminal device, the access probability of the terminal device being a probability of the terminal device to attempt to transmit the first signal using a given one of the allocated communications resources relative to a probability of each of the other terminal devices in the group of terminal devices to attempt to transmit a signal using the given one of the allocated communications resources.

23. A terminal device according to clause 22, wherein the access probability of the terminal device is higher relative to the access probability of each of the other terminal devices in the group of terminal devices when the terminal device is configured to provide a local cell in the wireless telecommunications network.

24. A terminal device according to any one of clauses 15 to 23, wherein:

the transceiver is configured to receive, prior to receiving the information indicative of the plurality of communication resources, configuration information comprising a group identifier (group ID) identifying the group of terminal devices;

the received information indicative of the plurality of communication resources is scrambled using the group ID; and the controller is configured to descramble the received information indicative of the plurality of communication resources using the group ID.

25. A terminal device for use with a wireless telecommunications network, the terminal device comprising:
a transceiver configured to transmit information indicative of a plurality of communication resources, each of the indicated plurality of communication resources being allocated for use by each of the terminal devices in a group of terminal devices in transmitting signals to the wireless telecommunications network via the terminal device on a contention basis, when the terminal device provides a local cell for providing wireless connectivity for the group of terminal devices; and
a controller configured to:
monitor the allocated communication resources for signals received at the transceiver from the terminal devices of the group, the monitoring comprising performing an operation with respect to each of the allocated communication resources to determine whether a signal has been received by the transceiver via that communication resource from a single identified one of the terminal devices of the group; and
if it is determined that a signal has been received by the transceiver via one of the allocated communication resources from a single identified one of the terminal devices of the group, control the transceiver to transmit an acknowledgement message to the identified terminal device and transmit, to each of the terminal devices in the group, reservation information indicative of one or more of the allocated communication resources which are reserved for use by the identified terminal device.

26. A terminal device according to clause 25, wherein the allocated communication resources are periodically repeated in time over one or more consecutive radio frames, each repeat of the allocated communication resources being monitored by the controller, and the one or more of the allocated communication resources reserved for use by the identified terminal device are reserved for a predetermined number of repeats of the allocated communication resources.

27. A terminal device according to clause 26, wherein the allocated communication resources form a portion of a repeating interval of communication resources and are distributed such that a portion of the allocated communication resources are non-consecutive communication resources in the repeating interval.

28. A terminal device according to clause 26 or 27, wherein the controller is operable to monitor the allocated communication resources for signals received from the terminal devices of the group, the monitoring comprising performing an operation with respect to each of the allocated communication resources to determine whether a signal has been received by the transceiver via that communication resource from any of the terminal devices of the group, and if it is determined that no signal has been received via at least a portion of the allocated communication resources for more than a predetermined number of consecutive repeats of the allocated communication resources, control the transceiver to transmit information indicating that at least the portion of the allocated communication resources is available for use by other terminal devices.

29. A terminal device according to any one of clauses 26 to 28, wherein the controller is operable to monitor the one or more of the allocated communication resources reserved for use by the identified terminal device, the monitoring comprising performing an operation with respect to each of the one or more reserved communication resources to determine whether a signal has been received via that communication resource from the identified terminal device, and if it is determined that no signal has been received via at least a portion of the one or more reserved communication resources for more than a predetermined number of consecutive repeats of the allocated communication resources, control the transceiver to transmit information indicating that at least the portion of the one or more reserved communication resources is available for use by the other terminal devices of the group in transmitting signals to the wireless telecommunications network on a contention basis.

30. A terminal device according to any one of clauses 25 to 29, wherein:
the transceiver is configured to transmit, prior to transmitting the information indicative of the plurality of communication resources, configuration information comprising a group identifier (group ID) identifying the group of terminal devices to each terminal device in the group of terminal devices; and
the controller is configured to scramble the information indicative of the plurality of communication resources is scrambled using the group ID prior to transmission of the information indicative of the plurality of communication resources.

31. Infrastructure equipment for use with a wireless telecommunications network, the infrastructure equipment comprising:
a transceiver configured to transmit information indicative of a plurality of communication resources, each of the indicated plurality of communication resources being allocated for use by each of the terminal devices in a group of terminal devices in transmitting signals to the wireless telecommunications network via the infrastructure equipment on a contention basis; and
a controller configured to:
monitor the allocated communication resources for signals received at the transceiver from the terminal devices of the group, the monitoring comprising performing an operation with respect to each of the allocated communication resources to determine whether a signal has been received by the transceiver via that communication resource from a single identified one of the terminal devices of the group; and
if it is determined that a signal has been received by the transceiver via one of the allocated communication resources from a single identified one of the terminal devices of the group, control the transceiver to transmit an acknowledgement message to the identified terminal device and transmit, to each of the terminal devices in the group, reservation information indicative of one or more of the allocated communication resources which are reserved for use by the identified terminal device.

32. A method of controlling a terminal device for use with a wireless telecommunications network as one of a group of terminal devices, the method comprising:
controlling a transceiver of the terminal device
to receive information indicative of a plurality of communication resources, each of the indicated plurality of communication resources being allocated for use by the terminal devices of the group in transmitting signals to the wireless telecommunications network on a contention basis; and
to transmit a first signal to the wireless telecommunications network using a selected one of the allocated communication resources;

determining whether the transceiver has received an acknowledgement message from the wireless telecommunications network;

if it is determined that the transceiver has received an acknowledgement message, determining that the first signal has been successfully received by the wireless telecommunications network; and if it is determined that the transceiver has not received an acknowledgement message, controlling the transceiver to re-transmit the first signal to the wireless telecommunications network, wherein a random selection operation is performed by randomly selecting the one of the allocated communications resources for transmitting the first signal from the plurality of communication resources allocated to the group of terminal devices.

33. A method of controlling a terminal device for use with a wireless telecommunications network, the method comprising:

controlling a transceiver of the terminal device to transmit information indicative of a plurality of communication resources, each of the indicated plurality of communication resources being allocated for use by each of the terminal devices in a group of terminal devices in transmitting signals to the wireless telecommunications network via the terminal device on a contention basis, when the terminal device provides a local cell for providing wireless connectivity for the group of terminal devices;

monitoring the allocated communication resources for signals received at the transceiver from the terminal devices of the group, the monitoring comprising performing an operation with respect to each of the allocated communication resources to determine whether a signal has been received by the transceiver via that communication resource from a single identified one of the terminal devices of the group; and if it is determined that a signal has been received by the transceiver via one of the allocated communication resources from a single identified one of the terminal devices of the group, controlling the transceiver to transmit an acknowledgement message to the identified terminal device and transmit, to each of the terminal devices in the group, reservation information indicative of one or more of the allocated communication resources which are reserved for use by the identified terminal device.

34. A method of controlling infrastructure equipment for use with a wireless telecommunications network, the method comprising:

controlling a transceiver of the infrastructure equipment to transmit information indicative of a plurality of communication resources, each of the indicated plurality of communication resources being allocated for use by each of the terminal devices in a group of terminal devices in transmitting signals to the wireless telecommunications network via the infrastructure equipment on a contention basis; and monitoring the allocated communication resources for signals received at the transceiver of the infrastructure equipment from the terminal devices of the group, the monitoring comprising performing an operation with respect to each of the allocated communication resources to determine whether a signal has been received by the transceiver via that communication resource from a single identified one of the terminal devices of the group; and if it is determined that a signal has been received by the transceiver of the infrastructure equipment via one of the allocated communication resources from a single identified one of the terminal devices of the group, controlling the transceiver to transmit an acknowledgement message to the identified terminal device and transmit, to each of the terminal devices in the group, reservation information indicative of one or more of the allocated communication resources which are reserved for use by the identified terminal device.

35. A wireless telecommunications system comprising a terminal device according to any one of clauses 15 to 24 and one of a terminal device according to any one of clauses 25 to 30 and infrastructure equipment according to clause 31.

36. Integrated circuitry for a first terminal device for exchanging signals with a wireless telecommunications network and a plurality of second terminal devices, the integrated circuitry comprising:

a transceiver element configured to exchange signals with each of the plurality of second terminal devices, when the first terminal device provides a local cell for providing wireless connectivity for the plurality of second terminal devices, and to exchange signals with one or more infrastructure equipment of the wireless telecommunications network, and a controller element configured to control the transceiver element to receive, from each of the plurality of second terminal devices served by the first terminal device when providing the local cell, suitability information indicative of the suitability of each of one or more other terminal devices or infrastructure equipment of the wireless telecommunications network to exchange signals with that second terminal device to provide for that second terminal devices another local cell; and to control the transceiver element to transmit a handover command to one or more of the plurality of second terminal devices, the handover command instructing the one or more second terminal devices to exchange signals with the wireless telecommunications network via an identified more suitable terminal device or infrastructure equipment for providing a local cell, if one of the one or more other terminal devices or infrastructure equipment of the wireless telecommunications network other than the first terminal device is identified as being more suitable for serving the one or more second terminal devices served by the first terminal device.

37. Integrated circuitry for infrastructure equipment for use with a wireless telecommunications network, the integrated circuitry comprising:

a transceiver element configured to receive, from a first terminal device of the wireless telecommunications network, the first terminal device being configured to exchange signals with each of a plurality of second terminal devices of the wireless telecommunications network, when the first terminal device provides a local cell for providing wireless connectivity for the plurality of second terminal devices, and to exchange signals with the infrastructure equipment, suitability information indicative of the suitability of one or more other terminal devices or infrastructure equipment of the wireless telecommunications network to exchange signals with each of the plurality of second terminal devices to provide for that second terminal device another local cell; and a controller element configured to determine, on the basis of the suitability information, whether one of the one or more other terminal devices or infrastructure equipment of the wireless telecommunications network is more suitable for serving one or more of the second terminal devices served by the first terminal device;

in the case that one of the one or more other terminal devices or infrastructure equipment of the wireless telecommunications network is determined to be more suitable for serving one or more of the second terminal devices served by the first terminal device, control the transceiver element to transmit information indicative of the identified one or more other terminal devices or infrastructure equipment to the first terminal device.

38. Integrated circuitry for a terminal device for use with a wireless telecommunications network as one of a group of terminal devices, the integrated circuitry comprising:

a transceiver element configured to receive information indicative of a plurality of communication resources, each of the indicated plurality of communication resources being allocated for use by the terminal devices of the group in transmitting signals to the wireless telecommunications network on a contention basis; and a controller element configured to control the transceiver element to transmit a first signal to the wireless telecommunications network using a selected one of the allocated communication resources;

to determine whether the transceiver element has received an acknowledgement message from the wireless telecommunications network;

if it is determined that the transceiver element has received an acknowledgement message, determine that the first signal has been successfully received by the wireless telecommunications network; and if it is determined that the transceiver element has not received an acknowledgement message, control the transceiver element to re-transmit the first signal to the wireless telecommunications network, wherein the controller element is configured in combination with the transceiver element to perform a random selection operation by randomly selecting the one of the allocated communications resources for transmitting the first signal from the plurality of communication resources allocated to the group of terminal devices.

39. Integrated circuitry for a terminal device for use with a wireless telecommunications network, the integrated circuitry comprising:

a transceiver element configured to transmit information indicative of a plurality of communication resources, each of the indicated plurality of communication resources being allocated for use by each of the terminal devices in a group of terminal devices in transmitting signals to the wireless telecommunications network via the terminal device on a contention basis, when the terminal device provides a local cell for providing wireless connectivity for the group of terminal devices; and a controller element configured to:

monitor the allocated communication resources for signals received at the transceiver element from the terminal devices of the group, the monitoring comprising performing an operation with respect to each of the allocated communication resources to determine whether a signal has been received by the transceiver element via that communication resource from a single identified one of the terminal devices of the group; and if it is determined that a signal has been received by the transceiver element via one of the allocated communication resources from a single identified one of the terminal devices of the group, control the transceiver element to transmit an acknowledgement message to the identified terminal device and transmit, to each of the terminal devices in the group, reservation information indicative of one or more of the allocated communication resources which are reserved for use by the identified terminal device.

40. Integrated circuitry for infrastructure equipment for use with a wireless telecommunications network, the integrated circuitry comprising:

a transceiver element configured to transmit information indicative of a plurality of communication resources, each of the indicated plurality of communication resources being allocated for use by each of the terminal devices in a group of terminal devices in transmitting signals to the wireless telecommunications network via the infrastructure equipment on a contention basis; and a controller element configured to:

monitor the allocated communication resources for signals received at the transceiver element from the terminal devices of the group, the monitoring comprising performing an operation with respect to each of the allocated communication resources to determine whether a signal has been received by the transceiver element via that communication resource from a single identified one of the terminal devices of the group; and if it is determined that a signal has been received by the transceiver element via one of the allocated communication resources from a single identified one of the terminal devices of the group, control the transceiver element to transmit an acknowledgement message to the identified terminal device and transmit, to each of the terminal devices in the group, reservation information indicative of one or more of the allocated communication resources which are reserved for use by the identified terminal device.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signaling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signaled to UE in downlink signaling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.

[2] R2-156300. Text Proposal capturing outcome of email discussion: [91bis #34][LTE/LATRED] CB-PUSCH. Anaheim, USA, 16-20 Nov. 2015

The invention claimed is:

1. A method of controlling a terminal device for use with a wireless telecommunications network as one of a group of terminal devices, the method comprising:
controlling a transceiver of the terminal device
to receive information indicative of a plurality of communication resources, each of the indicated plurality of communication resources being allocated for use by the terminal devices of the group in transmitting signals to the wireless telecommunications network on a contention basis;
to transmit a first signal to the wireless telecommunications network using a selected one of the allocated communication resources;
to receive reservation information indicative of one or more of the allocated communication resources which are reserved for use by another one of the other terminal devices in the group;
to randomly select the one of the allocated communication resources from the allocated communication resources which are not reserved for use by another one of the terminal devices in the group; and
if it is determined that the transceiver has received an acknowledgement message, controlling the transceiver to receive updated reservation information indicative of one or more of the allocated communication resources which are reserved for use by the terminal device, and to transmit a second signal to the wireless telecommunications network using one of the communication resources reserved for use by the terminal device;
determining whether the transceiver has received an acknowledgement message from the wireless telecommunications network;
if it is determined that the transceiver has received an acknowledgement message, determining that the first signal has been successfully received by the wireless telecommunications network; and
if it is determined that the transceiver has not received an acknowledgement message, controlling the transceiver to re-transmit the first signal to the wireless telecommunications network,
wherein a random selection operation is performed by randomly selecting the one of the allocated communications resources for transmitting the first signal from the plurality of communication resources allocated to the group of terminal devices.

2. The method according to claim 1, wherein the allocated communication resources are periodically repeated in time over one or more consecutive radio frames, and the one or more of the allocated communication resources reserved for use by the terminal device are reserved for a predetermined number of repeats of the allocated communication resources.

3. The method according to claim 2, wherein the allocated communication resources form a portion of a repeating interval of communication resources and are distributed such that a portion of the allocated communication resources are non-consecutive communication resources in the repeating interval.

4. The method according to claim 2, wherein, in the case that no signal has been received via at least a portion of the allocated communication resources for more than a predetermined number of consecutive repeats of the allocated communication resources, the transceiver is configured to receive information indicating that at least the portion of the allocated communication resources is available for use by other terminal devices.

5. The method according to claim 2, wherein, in the case that no signal has been received via at least a portion of the one or more of the allocated communication resources reserved for use by the terminal device for more than a predetermined number of consecutive repeats of the allocated communication resources, the transceiver is configured to receive information indicating that at least the portion of the one or more reserved communication resources is available for use by the other terminal devices of the group in transmitting signals to the wireless telecommunications network on a contention basis.

6. The method according to claim 1, further controlling the transceiver
to receive, prior to receiving the information indicative of the plurality of communication resources, configuration information comprising a group identifier (group ID) identifying the group of terminal devices;
the received information indicative of the plurality of communication resources is scrambled using the group ID; and
to descramble the received information indicative of the plurality of communication resources using the group ID.

7. A method of controlling a terminal device for use with a wireless telecommunications network, the method comprising:
controlling a transceiver of the terminal device to
transmit information indicative of a plurality of communication resources, each of the indicated plurality of communication resources being allocated for use by each terminal device in a group of terminal devices in transmitting signals to the wireless telecommunications network via the terminal device on a contention basis, when the terminal device provides a local cell for providing wireless connectivity for the group of terminal devices;

monitoring the allocated communication resources for signals received at the transceiver from the terminal devices of the group, the monitoring comprising performing an operation with respect to each of the allocated communication resources to determine whether a signal has been received by the transceiver via that communication resource from a single identified one of the terminal devices of the group; and if it is determined that a signal has been received by the transceiver via one of the allocated communication resources from a single identified one of the terminal devices of the group, controlling the transceiver to transmit an acknowledgement message to the identified terminal device and transmit, to each of the terminal devices in the group, reservation information indicative of one or more of the allocated communication resources which are reserved for use by the identified terminal device;

wherein the allocated communication resources form a portion of a repeating interval of communication resources and are distributed such that a portion of the allocated communication resources are non-consecutive communication resources in the repeating interval.

8. The method according to claim 7, wherein the allocated communication resources are periodically repeated in time over one or more consecutive radio frames, each repeat of the allocated communication resources being monitored, and the one or more of the allocated communication resources reserved for use by the identified terminal device are reserved for a predetermined number of repeats of the allocated communication resources.

9. The method according to claim 7, further monitoring the allocated communication resources for signals received from the terminal devices of the group, the monitoring comprising performing an operation with respect to each of the allocated communication resources to determine whether a signal has been received by the transceiver via that communication resource from any of the terminal devices of the group, and if it is determined that no signal has been received via at least a portion of the allocated communication resources for more than a predetermined number of consecutive repeats of the allocated communication resources, control the transceiver to transmit information indicating that at least the portion of the allocated communication resources is available for use by other terminal devices.

10. The method according to claim 7, further monitoring the one or more of the allocated communication resources reserved for use by the identified terminal device, the monitoring comprising performing an operation with respect to each of the one or more reserved communication resources to determine whether a signal has been received via that communication resource from the identified terminal device, and if it is determined that no signal has been received via at least a portion of the one or more reserved communication resources for more than a predetermined number of consecutive repeats of the allocated communication resources, control the transceiver to transmit information indicating that at least the portion of the one or more reserved communication resources is available for use by the other terminal devices of the group in transmitting signals to the wireless telecommunications network on a contention basis.

11. The method according to claim 7, further controlling the transceiver
to transmit, prior to transmitting the information indicative of the plurality of communication resources, configuration information comprising a group identifier (group ID) identifying the group of terminal devices to each terminal device in the group of terminal devices; and
to scramble the information indicative of the plurality of communication resources is scrambled using the group ID prior to transmission of the information indicative of the plurality of communication resources.

12. A method of controlling infrastructure equipment for use with a wireless telecommunications network, the method comprising:
controlling a transceiver of the infrastructure equipment to transmit information indicative of a plurality of communication resources, each of the indicated plurality of communication resources being allocated for use by each terminal device in a group of terminal devices in transmitting signals to the wireless telecommunications network via the infrastructure equipment on a contention basis; and
monitoring the allocated communication resources for signals received at the transceiver of the infrastructure equipment from the terminal devices of the group, the monitoring comprising performing an operation with respect to each of the allocated communication resources to determine whether a signal has been received by the transceiver via that communication resource from a single identified one of the terminal devices of the group; and
if it is determined that a signal has been received by the transceiver of the infrastructure equipment via one of the allocated communication resources from a single identified one of the terminal devices of the group, controlling the transceiver to transmit an acknowledgement message to the identified terminal device and transmit, to each of the terminal devices in the group, reservation information indicative of one or more of the allocated communication resources which are reserved for use by the identified terminal device, wherein the allocated communication resources are periodically repeated in time over one or more consecutive radio frames, monitoring including monitoring each repeat of the allocated communication resources, and the one or more of the allocated communication resources reserved for use by the identified terminal device are reserved for a predetermined number of repeats of the allocated communication resources.

13. The method according to claim 12, wherein if it is determined that the transceiver has received an acknowledgement message, then controlling the transceiver to receive updated reservation information indicative of one or more of the allocated communication resources which are reserved for use by the terminal device, and to transmit a second signal to the wireless telecommunications network using one of the communication resources reserved for use by the terminal device.

14. The method according to claim 13, wherein the allocated communication resources are periodically repeated in time over one or more consecutive radio frames, and the one or more of the allocated communication resources reserved for use by the terminal device are reserved for a predetermined number of repeats of the allocated communication resources.

15. The method according to claim 14, wherein the allocated communication resources form a portion of a repeating interval of communication resources and are distributed such that a portion of the allocated communication resources are non-consecutive communication resources in the repeating interval.

16. The method according to claim 14, wherein, in the case that no signal has been received via at least a portion of the allocated communication resources for more than a predetermined number of consecutive repeats of the allocated communication resources, controlling the transceiver to receive information indicating that at least the portion of the allocated communication resources is available for use by other terminal devices.

17. The method according to claim 14, wherein, in the case that no signal has been received via at least a portion of the one or more of the allocated communication resources reserved for use by the terminal device for more than a predetermined number of consecutive repeats of the allocated communication resources, controlling the transceiver to receive information indicating that at least the portion of the one or more reserved communication resources is available for use by the other terminal devices of the group in transmitting signals to the wireless telecommunications network on a contention basis.

* * * * *